United States Patent
Kim et al.

(10) Patent No.: US 8,289,893 B2
(45) Date of Patent: Oct. 16, 2012

(54) APPARATUS AND METHOD FOR SUPPORTING MULTICAST COMMUNICATION IN BROADBAND WIRELESS ACCESS SYSTEM

(75) Inventors: Kyung-Kyu Kim, Seoul (KR); Rakesh Taori, Suwon-si (KR); Jae-Jeong Shim, Seongnam-si (KR); Yeong-Moon Son, Yongin-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 12/831,453

(22) Filed: Jul. 7, 2010

(65) Prior Publication Data

US 2011/0007683 A1 Jan. 13, 2011

(30) Foreign Application Priority Data

Jul. 7, 2009 (KR) .......................... 10-2009-0061672
Nov. 16, 2009 (KR) .......................... 10-2009-0110270
Jul. 7, 2010 (KR) .......................... 10-2010-0065296

(51) Int. Cl.
  *H04H 20/71* (2008.01)
  *H04W 4/00* (2009.01)
  *H04J 3/24* (2006.01)
  *H04J 3/26* (2006.01)

(52) U.S. Cl. ......... 370/312; 370/338; 370/349; 370/432

(58) Field of Classification Search .................. 370/310, 370/312, 315, 328–329, 332, 338, 349–350, 370/431–432, 437, 464–465, 471–475

See application file for complete search history.

(56) References Cited

U.S. PATENT DOCUMENTS

| | | | |
|---|---|---|---|
| 7,924,703 B2 * | 4/2011 | Ji et al. ........................ | 370/216 |
| 2005/0201269 A1 | 9/2005 | Shim et al. | |
| 2006/0153112 A1 | 7/2006 | Lim et al. | |
| 2006/0239264 A1 | 10/2006 | Kang et al. | |
| 2006/0239265 A1 * | 10/2006 | Son et al. ...................... | 370/390 |
| 2007/0268933 A1 | 11/2007 | Wu et al. | |
| 2007/0286127 A1 | 12/2007 | Inohiza | |
| 2010/0165908 A1 * | 7/2010 | Mun et al. .................... | 370/312 |
| 2011/0059761 A1 * | 3/2011 | Kim et al. .................... | 455/509 |
| 2011/0103289 A1 * | 5/2011 | Josiam et al. ................ | 370/312 |
| 2011/0134825 A1 * | 6/2011 | Kim et al. .................... | 370/312 |

* cited by examiner

*Primary Examiner* — Tri H Phan
(74) *Attorney, Agent, or Firm* — Jefferson IP Law, LLP

(57) ABSTRACT

An apparatus and a method for supporting multicast communication in a broadband wireless access system are provided. A method of a Mobile Station (MS) for supporting multicast communication in a wireless access system includes acquiring decoding parameters by receiving an Advanced Air Interface Enhanced-Multicast and Broadcast Service configuration (AAI-E-MBS_CFG) message from a Base Station (BS), establishing an E-MBS service flow by sending and receiving AAI Dynamic Service Addition-request/response (AAI_DSA-REQ/RSP) messages to and from the BS, and decoding E-MBS MAP received from the BS through the established E-MBS service flow using the acquired decoding parameters. The E-MBS MAP includes information for decoding multicast bursts.

30 Claims, 14 Drawing Sheets

APPARATUS AND METHOD FOR SUPPORTING MULTICAST COMMUNICATION IN BROADBAND WIRELESS ACCESS SYSTEM

PRIORITY

This application claims the benefit under 35 U.S.C. §119 (a) of a Korean patent application filed in the Korean Intellectual Property Office on Jul. 7, 2009, assigned Serial No. 10-2009-0061672, of a Korean patent application filed in the Korean Intellectual Property Office on Nov. 16, 2009 and assigned Serial No. 10-2009-0110270 and of a Korean patent application filed in the Korean Intellectual Property Office on Jul. 7, 2010 and assigned Serial No. 10-2010-0065296, the entire disclosures of both of which are hereby incorporated by reference.

BACKGROUND OF THE INVENTION

1. Field of the Invention

The present invention relates to a broadband wireless access system. More particularly, the present invention relates to an apparatus and a method for supporting multicast communication in a broadband wireless access system.

2. Description of the Related Art

In general, wireless communication systems have been developed mainly for voice service. Based on advances in technology, wireless communication systems now also provide data service and various multimedia services as well as the voice service. However, the voice-oriented communication system, which uses a relatively narrow transmission bandwidth and imposes expensive fees, has not satisfied increasing service demands of users. Moreover, advances in the communication industry and the increasing demand of users for Internet services create the necessity for a communication system that efficiently provides such advanced services. In this respect, a broadband wireless access system is introduced to efficiently provide Internet services with enough bandwidth to meet the increasing demand.

The broadband wireless access system supports not only the voice service but also various low- and high-speed data services and multimedia application services such as high quality video. The broadband wireless access system can access a Public Switched Telephone Network (PSTN), a Public Switched Data Network (PSDN), an Internet network, an International Mobile Telecommunications-2000 (IMT-2000) network, and an Asynchronous Transfer Mode (ATM) network based on wireless media using broadband frequencies such as 2 GHz, 5 GHz, 26 GHz, and 60 GHz in the mobile or stationary environment, and support a channel transfer rate of over 2 Mbps. Based on the mobility of a terminal (e.g., stationary or mobile), the communication environment (e.g., indoor or outdoor), and the channel transfer rate, the broadband wireless access system can be classified into a broadband wireless local loop, a broadband mobile access network, and a high-rate wireless Local Area Network (LAN).

The wireless access scheme of the broadband wireless access system is standardized by the Institute of Electrical and Electronics Engineers (IEEE) 802.16 standard group which is a standardization organization. An IEEE 802.16 standard system can transfer much data within a short time over the wide bandwidth and efficiently utilize the channel by allowing all users to share the channel (or resources), compared to conventional wireless technologies for the voice service. Also, because Quality of Service (QoS) is guaranteed, each user can enjoy services of different qualities according to characteristics of the service.

The IEEE 802.16 standard defines a Multicast and Broadcast Service (MBS) specification for multicasting and broadcasting data to a plurality of Mobile Stations (MSs). The MBS specification can distinguish common or overlapping multicast and broadcast service areas using different Connection IDentifiers (CIDs) or different Security Associations (SAs). Herein, an MBS zone is used to indicate a region where broadcast and multicast service flows are valid through the CID and the SA, and a Base Station (BS) broadcasts MBS zone information using a Downlink Channel Descriptor (DCD) message.

However, a conventional Multicast CID (hereafter, referred to as an MCID) allocation method for the multicast channel has the following shortcomings. In the near future, it is expected that the bandwidth of many broadcasting technologies such as cable TV or Digital Multimedia Broadcasting (DMB) will increase such that the user can select from hundreds of video, audio and data channels. In this respect, the system can provide the service by grouping the hundreds of channels on a regional basis considering the national scale. However, only 94 MCIDs are allowed according to the specification. As a result, it is impossible to allocate unique MCIDs to the hundreds of channels. Besides, the IEEE 802.16m standard defines a 12-bit STation IDentifier (STID) for identifying the MS, only for the unicast to the MS.

To address those shortcomings, it is necessary to newly define an ID for identifying the MS to support the multicast and an ID for distinguishing the service.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for supporting multicast communication in a broadband wireless access system.

Another aspect of the present invention is to provide an apparatus and a method of a Mobile Station (MS) for receiving a multicast message without distinguishing a separate station identifier in a broadband wireless access system.

Yet another aspect of the present invention is to provide an apparatus and a method of an MS receiving a multicast message for obtaining Enhanced-Multicast and Broadcast Service (E-MBS) service flow information without having to decode every A-MAP Information Element (IE) in a subframe in a broadband wireless access system.

Still another aspect of the present invention is to provide an apparatus and a method of an MS receiving a multicast message for obtaining E-MBS service flow information by decoding Multicast Flow IDentifier (MFID) of E-MBS_Data IE of E-MBS MAP region in a broadband wireless access system.

A further aspect of the present invention is to provide an apparatus and a method of a BS for classifying service groups by allocating a preset number of STation IDentifiers (STIDs) for the multicast service to the MS and other STIDs for the unicast service to the MS among all the STIDs, and distinguishing the type of the specific service belonging to the corresponding service group by allocating a Flow IDentifier (FID) in a broadband wireless access system.

In accordance with an aspect of the present invention, a method of a Mobile Station (MS) for supporting multicast communication in a wireless access system is provided. The method includes acquiring decoding parameters by receiving an Advanced Air Interface-E-MBS configuration (AAI-E-

MBS_CFG) message from a Base Station (BS), establishing an E-MBS service flow by sending and receiving Advanced Air Interface_Dynamic Service Addition (DSA)-request/response (AAI_DSA-REQ/RSP) messages to and from the BS, and decoding E-MBS MAP received from the BS through the established E-MBS service flow using the acquired decoding parameters. The E-MBS MAP includes information for decoding multicast bursts.

In accordance with another aspect of the present invention, an apparatus of an MS for supporting multicast communication in a wireless access system is provided. The apparatus includes a message transmitter and receiver for acquiring decoding parameters by receiving an AAI-E-MBS configuration (AAI-E-MBS_CFG) message from a BS, and establishing an E-MBS service flow by sending and receiving AAI_DSA-request/response messages (AAI_DSA-REQ/RSP) messages to and from the BS, and an E-MBS MAP analyzer for decoding E-MBS MAP received from the BS through the established E-MBS service flow using the acquired decoding parameters. The E-MBS MAP includes information for decoding multicast bursts.

In accordance with yet another aspect of the present invention, a method of a BS for supporting multicast communication in a wireless access system is provided. The method includes sending an AAI-E-MBS configuration (AAI-E-MBS_CFG) message including decoding parameters, to an MS, establishing E-MBS service flow by sending and receiving DSA-request/response (AAI_DSA-REQ/RSP) messages to and from the MS, and transmitting E-MBS MAP to the MS through the established E-MBS service flow. The E-MBS MAP includes information for decoding multicast bursts.

In accordance with still another aspect of the present invention, an apparatus of a BS for supporting multicast communication in a wireless access system is provided. The apparatus includes a message transmitter and receiver for sending an AAI-E-MBS configuration (AAI-E-MBS_CFG) message including decoding parameters, to an MS, establishing E-MBS service flow by sending and receiving AAI_DSA-request/response (AAI_DSA-REQ/RSP) messages to and from the MS, and transmitting E-MBS MAP to the MS through the established E-MBS service flow, and an E-MBS MAP generator for generating the E-MBS MAP which includes information for decoding multicast bursts.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for supporting multicast communication in a broadband wireless access system. More particularly, the present invention provides a method of a Mobile Station (MS) for receiving a multicast message without separately distinguishing a station IDentifier (ID) in the broadband wireless access system.

Herein, the broadband wireless access system employs an Institute of Electrical and Electronics Engineers (IEEE) 802.16m system by way of example. Note that the present invention is applicable to any system including an MS which needs to receive a multicast message.

Figure 1:
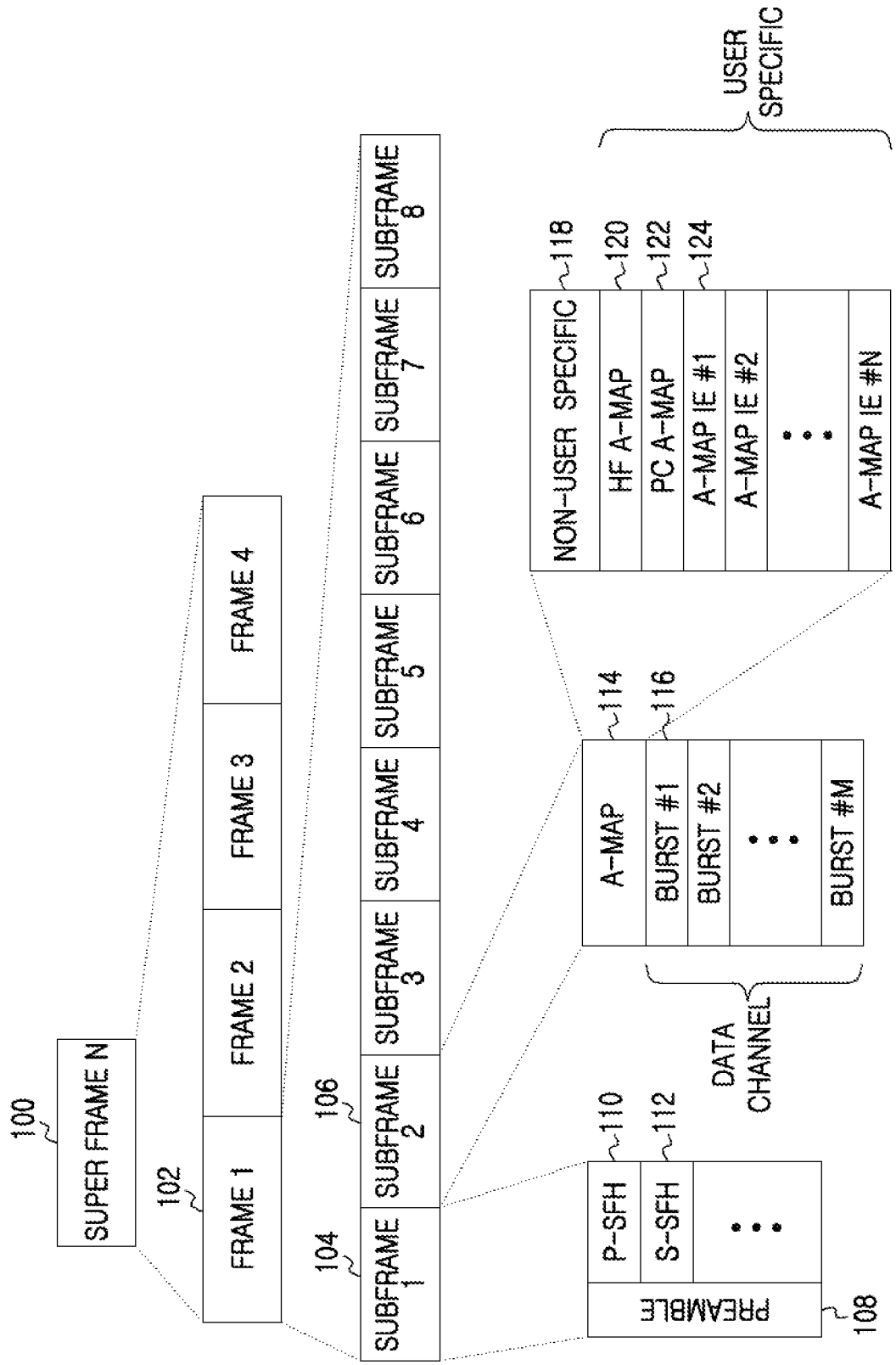
FIG. 1 illustrates a frame structure of an Institute of Electrical and Electronics Engineers (IEEE) 802.16m system according to an exemplary embodiment of the present invention.

FIG. 1 illustrates a frame structure of an IEEE 802.16m system according to an exemplary embodiment of the present invention.

Referring to FIG. 1, the frame structure of the IEEE 802.16m system is hierarchical and includes a super-frame 100, frames 102, and subframes 104 and 106. Each super-frame 100 includes four frames 102. The four frames 102 each include eight subframes 104 and 106. Each subframe 104 and 106 includes a plurality of (e.g., six) Orthogonal Frequency Division Multiple Access (OFDMA) symbols (not shown). A plurality of (e.g., five) the eight subframes 104 and 106 constitute a DownLink (DL) interval, and the other (e.g., three) subframes constitute an Uplink (UL) interval. However, the DL interval and the UL interval may vary according to the division percentage of the eight subframes 104 and 106.

The first subframe 104 of each super-frame 100 is a super frame header which carries a preamble 108, a Primary-Super Frame Header (P-SFH) channel 110, and a Secondary-SFH (S-SFH) channel 112. The P-SFH channel 110 includes necessary system information required for communication between the MS and the Base Station (BS). The P-SFH channel 110 also includes information required for decoding the S-SFH channel 112. The S-SFH channel 112 includes, if necessary, other system information.

In the other subframes 106, except for the first subframe 104, of the DL interval of each super-frame 100, an A-MAP region 114 exists in every subframe or every two subframes. The remaining region excluding the A-MAP region 114 delivers at least one burst (or packet) 116 including a control message (a signaling message) or traffic. The bursts 116 in the corresponding subframe are allocated by A-MAP Information Elements (IEs) 124 of the A-MAP region 114 occupying the upper portion of the subframe. When every subframe includes the A-MAP region 114, the corresponding A-MAP IEs 124 include allocation information (i.e., information relating to locations and sizes) of the bursts 116 transmitted over the other region of the corresponding subframe. Likewise, when every other subframe includes the A-MAP region 114, the corresponding A-MAP IEs 124 include allocation information of the bursts 116 transmitted over the other region of the two corresponding subframes.

The A-MAP region 114 includes a non-user specific region 118 and a user-specific region. The non-user specific region 118 includes information indicating the size of the A-MAP region 114. Based on the size information of the A-MAP region 114, the boundary of the A-MAP region 114 can be acquired. The user-specific region includes a Hybrid Automatic Repeat reQuest (HARQ) Feedback (HF) A-MAP 120, a Power Control (PC) A-MAP 122, and the A-MAP IEs 124. The HF A-MAP 120 includes feedback information regarding a HARQ procedure, the PC A-MAP 122 includes the power level, and the A-MAP IE 124 includes the allocation information of the corresponding burst 116. For example, in FIG. 1, among the A-MAP IEs in the A-MAP region 114, the A-MAP IE #1 124 can indicate the allocation information of the Burst #1 116 and the A-MAP IE #2 can indicate the allocation information of the Burst #2. The MSs acquire the location and the size of their data bursts by receiving and decoding the A-MAP IEs of the A-MAP region, and then decode the bursts of the acquired size at the acquired location.

Figure 2:
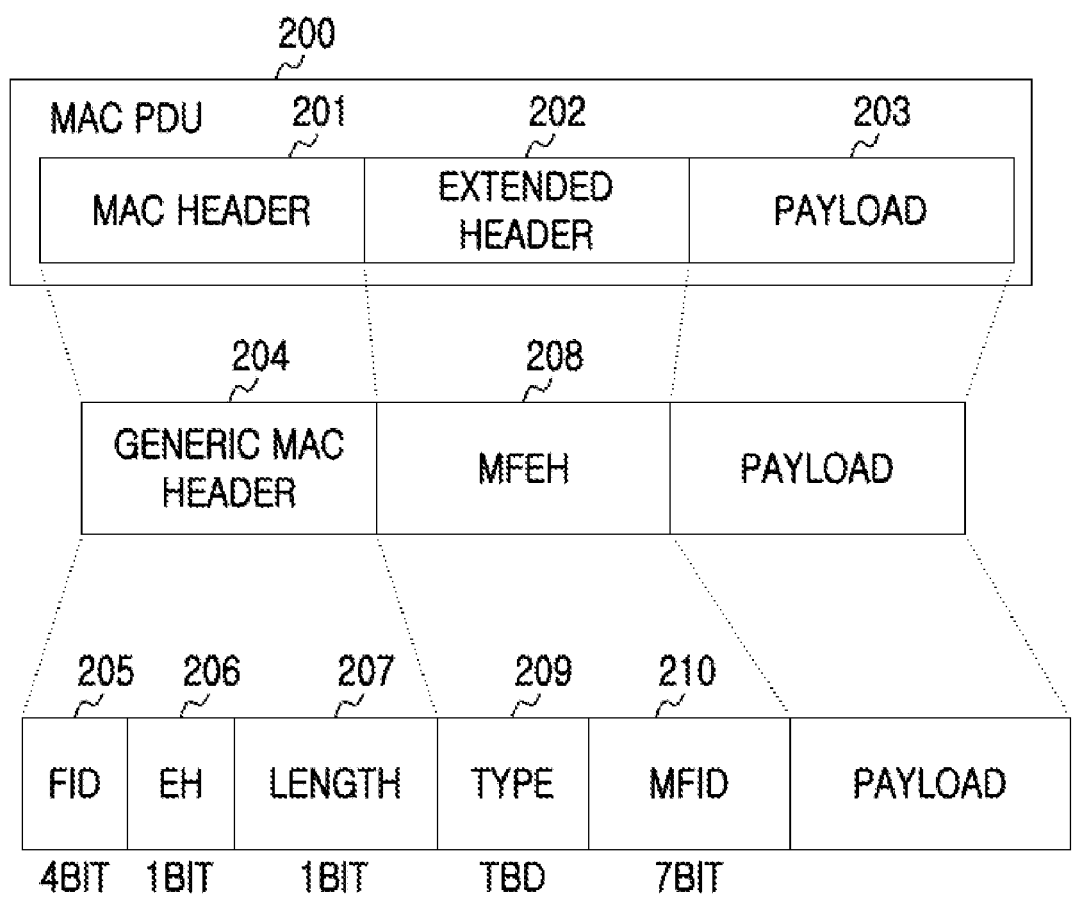
FIG. 2 is a diagram of a Media Access Control Packet Data Unit (MAC PDU) of an IEEE 802.16m system according to an exemplary embodiment of the present invention.

FIG. 2 is a diagram of a Media Access Control Packet Data Unit (MAC PDU) of an IEEE 802.16m system according to an exemplary embodiment of the present invention.

Referring to FIG. 2, the IEEE 802.16m MAC PDU 200 includes a MAC header 201, an extended header 202, and payload 203.

The MAC header 201 contains a generic MAC header 204 including a Flow ID (FID) field 205, an Extended Header (EH) field 206, and a Length field 207. The FID field 205, which is 4 bits in size, defines characteristics of the service flow of the current MAC PDU and classifies the service flows other than the multicast. The EH field 206 marks the presence or absence of the extended header 202 using 1 bit. The Length field 207 marks the total size of the MAC PDU. The generic MAC header 204 determines the FID field 205 to an agreed value when the multicast MAC PDU is transmitted, and records bits of the EH field 206 as '1' to indicate the presence of a Multicast FID (MFID) field 210 of the present invention in the extended header 202.

The extended header 202 contains an MFID Extended Header (MFEH) 208, and includes a Type field 209 and an MFID field 210. The Type field 209 indicates the type of the extended header 202. The MFID field 210 indicates the multicast service flow type of the MAC PDU.

Figure 3:
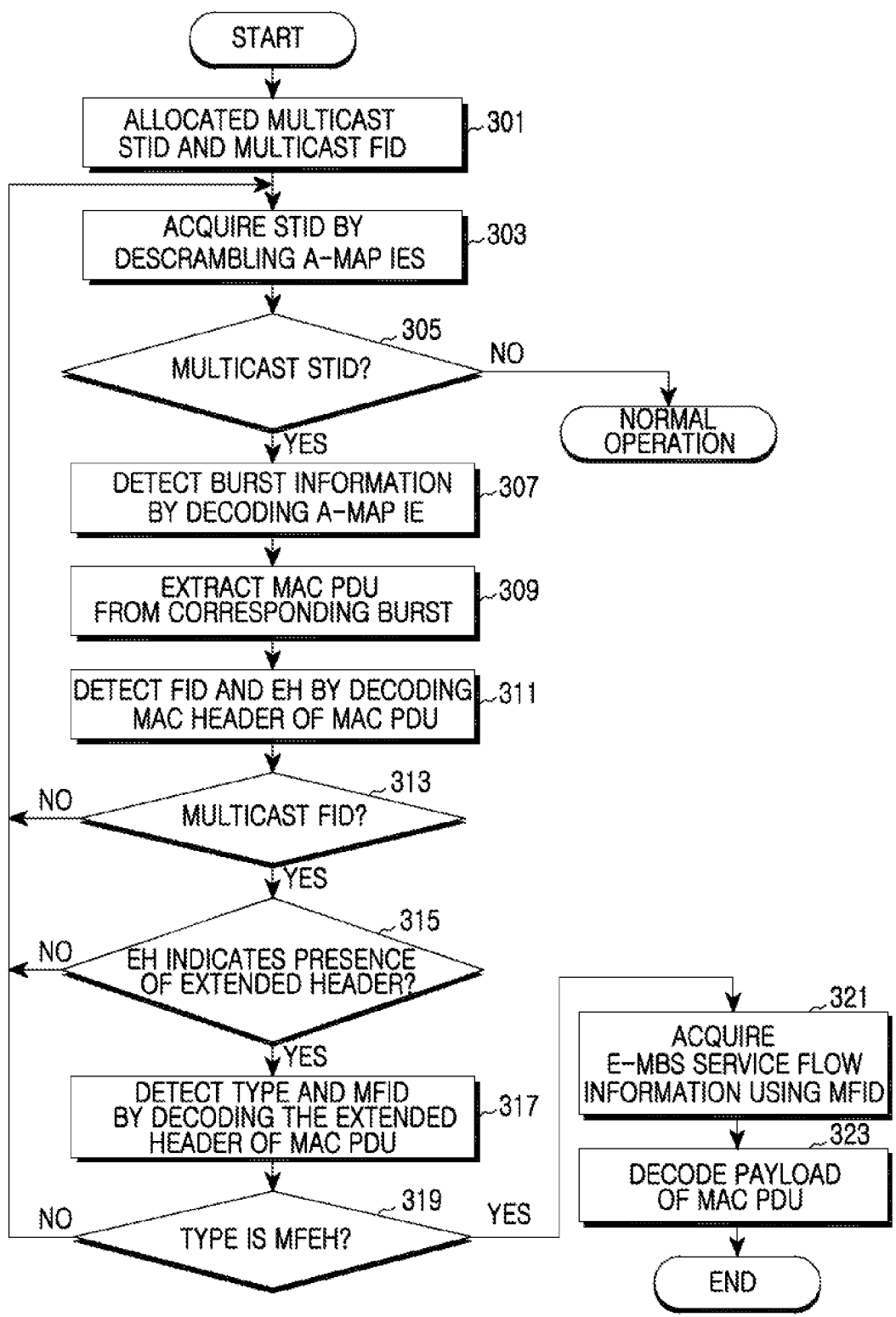
FIG. 3 is a flowchart of a method of a Mobile Station (MS) for receiving a multicast message for obtaining Enhanced Multicast and Broadcast Service (E-MBS) service flow information by decoding a Multicast Flow IDentifier (MFID) of an extended header of a corresponding MAC PDU in a broadband wireless access system according to an exemplary embodiment of the present invention.

FIG. 3 is a flowchart of a method of an MS for receiving a multicast message for obtaining Enhanced Multicast and Broadcast Service (E-MBS) service flow information by decoding an MFID of an extended header of a corresponding MAC PDU in a broadband wireless access system according to an exemplary embodiment of the present invention.

Referring to FIG. 3, in step 301, the MS completes registration with the BS and is allocated a multicast STation IDentifier (STID) and a multicast FID from the BS through negotiation. Herein, the STID can be a preset value before the MS and the BS perform the registration. In this case, the multicast STID can be allocated without the negotiation.

The MS acquires an STID by descrambling one or more A-MAP IEs in the A-MAP region of the received subframe in step 303, and determines whether the acquired STID matches the allocated multicast STID in step 305.

If it is determined in step 305 that the acquired STID does not match the allocated multicast STID, the MS conducts a normal operation.

In contrast, if it is determined in step 305 that the acquired STID matches the allocated multicast STID, the MS decodes the corresponding A-MAP IE using the multicast STID and detects burst information from the A-MAP IE according to the decoding in step 307. Herein, the burst information may include a Modulation and Coding Scheme (MCS) level of the corresponding burst, and the allocation information (i.e., the information relating to the location and the size).

The MS extracts the MAC PDU from the corresponding burst using the detected burst information in step 309, and detects the FID and the EH by decoding the MAC header of the extracted MAC PDU in step 311.

In step 313, the MS determines whether the detected FID matches the allocated multicast FID.

If it is determined in step 313 that the detected FID does not match the allocated multicast FID, the MS processes the MAC PDU as an error and returns to step 303 to repeat the subsequent steps.

On the other hand, if it is determined in step 313 that the detected FID matches the allocated multicast FID, the MS determines whether the detected EH indicates the presence of the extended header in step 315.

If it is determined in step 315 that the detected EH does not indicate the presence of the extended header though the detected FID matches the allocated multicast FID, the MS processes the MAC PDU as an error and returns to step 303 to repeat the subsequent steps.

On the other hand, if it is determined in step 315 that the detected FID matches the allocated multicast FID and the detected EH indicates the presence of the extended header, the MS detects the Type and the MFID by decoding the extended header of the extracted MAC PDU in step 317 and determines whether the detected Type matches the type assigned to the MFEH in step 319.

If it is determined in step 319 that the detected Type does not match the type assigned to the MFEH, the MS processes the MAC PDU as an error and returns to step 303 to repeat the subsequent steps.

In contrast, if it is determined in step 319 that the detected Type matches the type assigned to the MFEH, the MS acquires E-MBS service flow information using the detected MFID in step 321.

In step 323, the MS decodes the payload of the extracted MAC PDU using the acquired E-MBS service flow information. Thus, the MS can receive information contained in the payload.

Next, the MS finishes this process.

Figure 4:
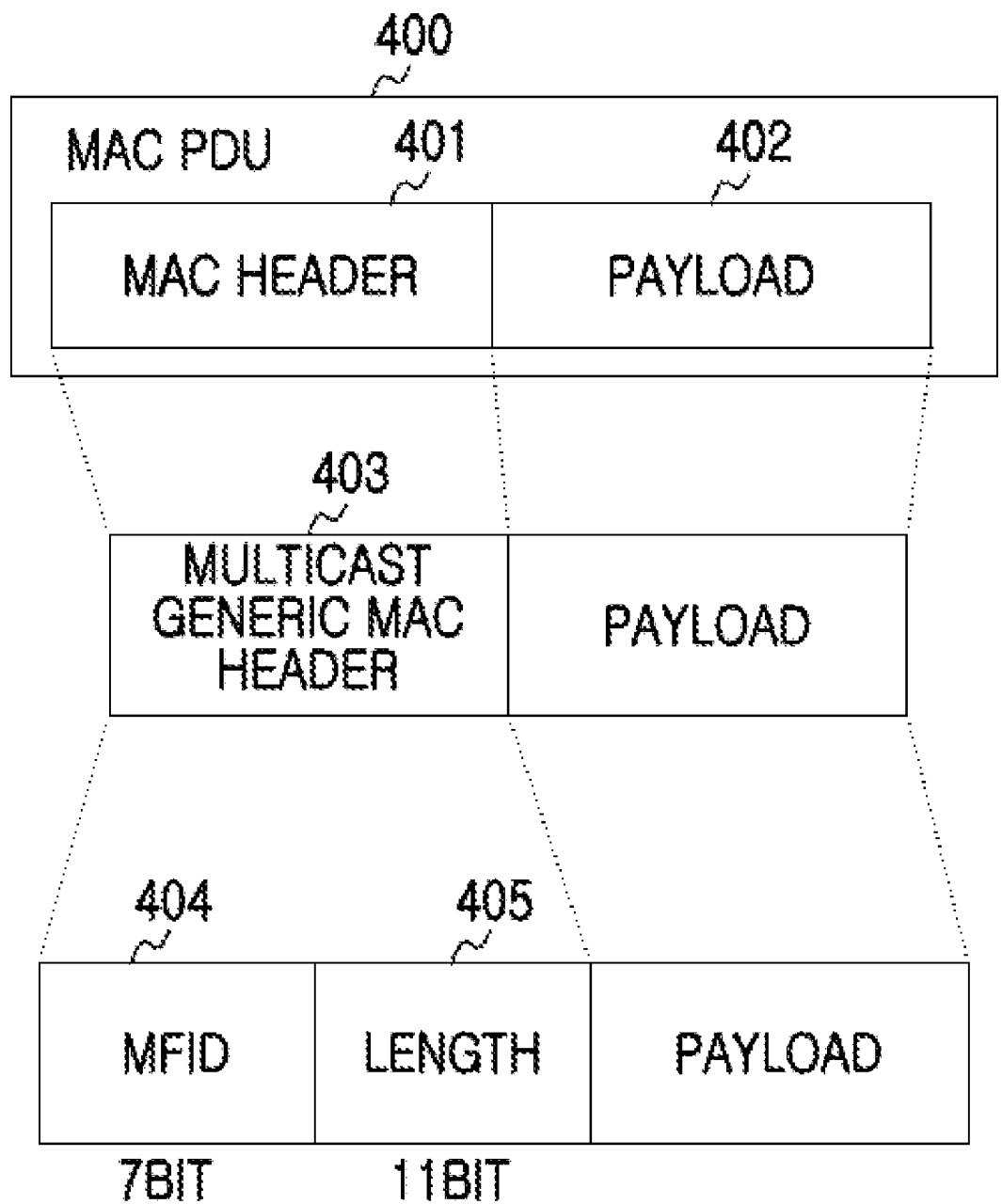
FIG. 4 is a diagram of a MAC PDU of an IEEE 802.16m system according to an exemplary embodiment of the present invention.

FIG. 4 is a diagram of a MAC PDU of an IEEE 802.16m system according to an exemplary embodiment of the present invention.

Referring to FIG. 4, the IEEE 802.16m MAC PDU 400 includes a MAC header 401 and payload 402. The MAC header 401 contains a Multicast Generic MAC Header (MGMH) 403, and includes an MFID field 404 and a Length field 405. The MFID field 404 is 7 bits in size and marks the multicast service flow type of the MAC PDU. The Length field 405, 11 bits in size, indicates the total size of the MAC PDU. For generating a packet including the multicast service flow, the BS can transmit the MGMH 403 as the MAC header in the downlink. In so doing, the MS drives a process for analyzing the MGMH 403, and can determine the service type and the characteristic of the multicast packet by decoding the MFID field 404 of the MGMH 403.

Figure 5:
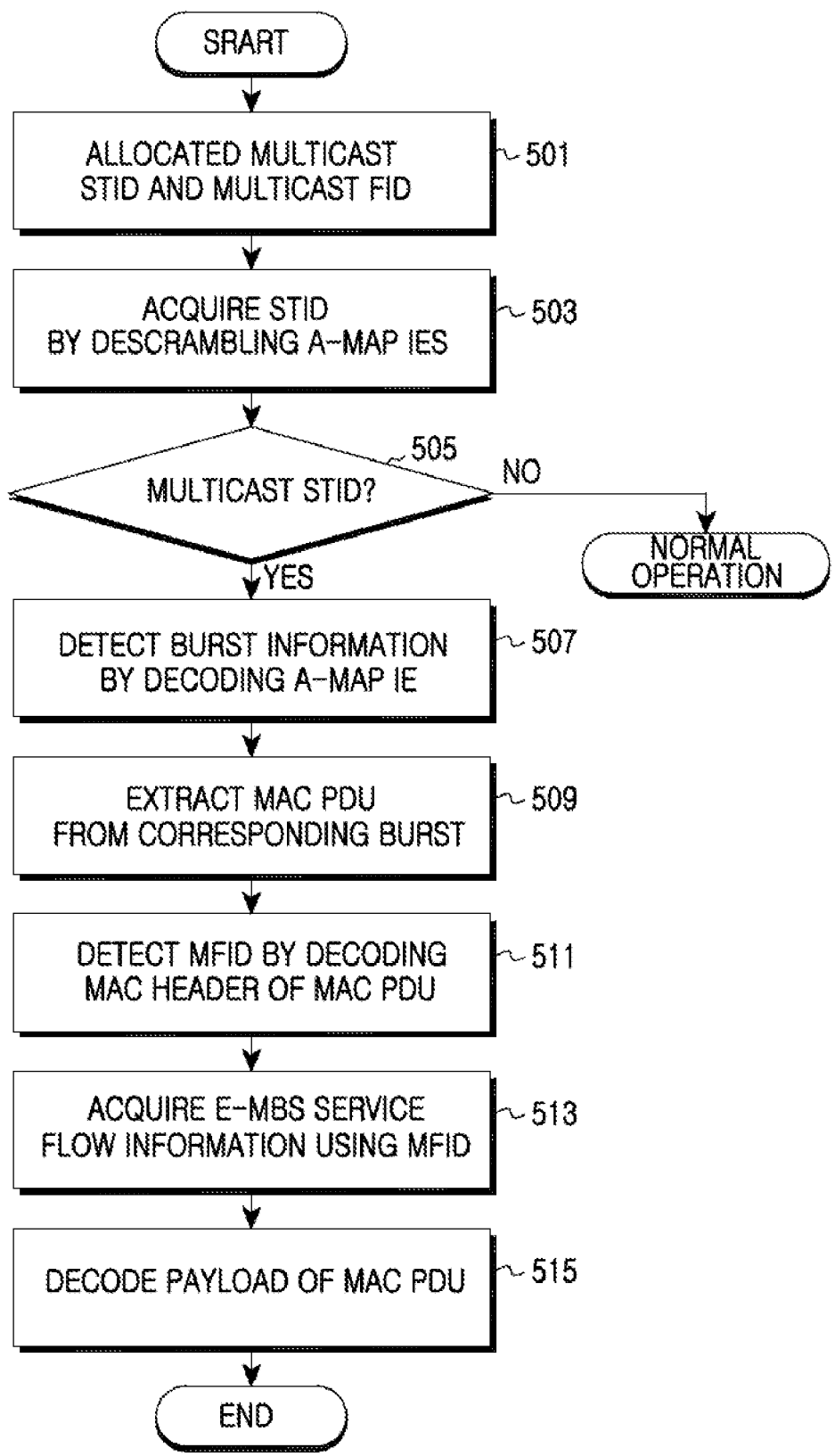
FIG. 5 is a flowchart of a method of an MS for receiving a multicast message for obtaining E-MBS service flow information by decoding an MFID of a generic MAC header for a corresponding multicast in a broadband wireless access system according to an exemplary embodiment of the present invention.

FIG. 5 is a flowchart of a method of an MS for receiving a multicast message for obtaining E-MBS service flow information by decoding an MFID of a generic MAC header for a corresponding multicast in a broadband wireless access system according to an exemplary embodiment of the present invention.

Referring to FIG. 5, in step 501, the MS completes registration with a BS and is allocated a multicast STID and a multicast FID from the BS through negotiation. Herein, the STID can be a preset value before the MS and the BS perform the registration. In this case, the multicast STID can be allocated without negotiation.

The MS acquires an STID by descrambling one or more A-MAP IEs in the A-MAP region of the received subframe in step 503, and determines whether the acquired STID matches the allocated multicast STID in step 505.

If it is determined in step 505 that the acquired STID does not match the allocated multicast STID, the MS conducts a normal operation.

In contrast, if it is determined in step 505 that the acquired STID matches the allocated multicast STID, the MS recognizes the MGMH in the MAC PDU of the corresponding burst and performs the relevant process.

In step 507, the MS decodes the corresponding A-MAP IE using the multicast STID and detects burst information from the A-MAP IE according to the decoding. Herein, the burst information includes the MCS level of the corresponding burst, and the allocation information (i.e., the information relating to the location and the size).

The MS extracts the MAC PDU from the corresponding burst using the detected burst information in step 509, and detects the MFID by decoding the MAC header of the extracted MAC PDU in step 511.

The MS acquires E-MBS service flow information using the detected MFID in step 513.

In step 515, the MS decodes the payload of the extracted MAC PDU using the acquired E-MBS service flow information. Thus, the MS can receive information contained in the payload.

Next, the MS finishes this process.

While the method for obtaining the address of the multicast service flow includes transmitting the MAC header or the extended header by inserting the MFID according to exemplary embodiments of the present invention, the MFID can be transmitted via a separate MAP regardless of the MAC header or the extended header. That is, without having to determine whether each burst is a multicast burst based on the header, the MS can detect the multicast burst using the information contained in the MAP region in early stages. The location of the MAC region can vary according to the structure of the system. The E-MBS MAP according to exemplary embodiments of the present invention operates separately from the A-MAP of the IEEE 802.16m, and the E-MBS MAP and the contained E-MBS_DATA IE can be formatted as shown in Table 1 and Table 2.

TABLE 1

| Syntax | Size | Notes |
|---|---|---|
| E-MBS MAP Message format( ) | | |
|   Management Message Type | TBD | |
|   #E-MBS_DATA IE( ) | TBD | |
|     for(i=0; i<n; i++){ | | |
|       E-MBS_DATA IE( ) | Variable | |
|     } | | |
|   #Extended E-MBS_DATA IE( ) | | |
|     for(i=0; i<n; i++){ | | |

TABLE 1-continued

| Syntax | Size | Notes |
|---|---|---|
|     Extended E-MBS_DATA IE( ) | Variable | |
|   } | | |
|   if(!byte boundary){ | TBD | |
|     Padding Nibble | | |
|   } | | |
|   TLV encoding element | | |
| } | | |

TABLE 2

| Syntax | Size | Notes |
|---|---|---|
| E-MBS_DATA IE( ){ | | |
|   MBS MAP Type = 0 | — | 0: E-MBS_DATA IE<br>1: Extended E-MBS_MAP IE (if used) |
|   MCS | 4 | Depends on supported modes, 16 modes assumed as baseline |
|   No. of MFID | 3 | |
|   for(i=0; i<No. of MFID; i++){ | | |
|     MFID | 7 | 7LSBs of FID for multicast (If E-MBS ID + FID is used, this field can span to 16 bit) |
|   } | | |
|   E-MBS Resource Indexing | TBD | Includes the resource location and allocation size (variable number of bit depends on system bandwidth) |
|   E-MBS Frame/Subframe offset | TBD | Includes the frame/subframe location and allocation size |
|   Allocation Period | TBD | Frame offset for multiple transmission instances (in number of frames) |
|   Long TTI indicator (if use) | TBD | Indicates number of subframes spanned by the allocation resource |
| } | | |

As shown in Table 1 and Table 2, the E-MBS MAP according to exemplary embodiments of the present invention represents the resource reservation status of each multicast service flow using the E-MBS_Data IE. Since the E-MBS_DATA IE of Table 2 includes the MCS level of the corresponding burst, the MS can immediately decode the corresponding burst. If the same robust MCS level is applied to every E-MBS_DATA IE, the MCS field can be omitted from the E-MBS_DATA IE. The E-MBS_DATA IE includes the 7-bit MFID field of the present invention to classify the type of the multicast service flow, the E-MBS Resource Indexing field to indicate the allocation information (i.e., information relating to the type, the location and the size) of the allocated burst, and the E-MBS Frame/Subframe offset field to indicate the location of the frame delivering the corresponding burst.

The E-MBS_DATA IE includes the Allocation Period field indicating the period of the next E-MBS frame, which specifies the location of the next MBS DATA burst when the MS uses the same service in a row, to thus reduce the overhead of the MS which needs to decode every MAP. Herein, the Allocation Period field varies per IE, and it is necessary to decode the MBS DATA burst of the corresponding frame according to an index defined per IE. When the information (the period, the location, the size, the MCS level, and so on) contained in the existing E-MBS_DATA IE of the service content periodically repeated is changed, the BS can insert an indicator so that the corresponding MS can recognize this change. If the Allocation Period information can be provided in a different manner (e.g., Dynamic Service Addition (DSA) procedure), the Allocation Period field can be omitted from the E-MBS_DATA IE.

The MFID according to exemplary embodiments of the present invention includes service flow classification information (e.g., broadcasting, VOD, etc.) to support the multicast, may represent the QoS level, and can be formatted as shown in Table 3. When the MFID is provided as stated above, the MS can receive the multicast message without separately distinguishing the MSID.

TABLE 3

| Field | Size(bits) | Description |
|---|---|---|
| MFID | 7 | identify the multicast service flow |

As shown in Table 3, the MFID includes identification information for identifying the multicast service flow. The identification information is mapped in accordance with the type and the characteristics of the serviced multicast flow. The MFID can be uniquely allocated within the multimedia service coverage or the entire network. When the MFID is unique in the multicast service coverage, it can be mapped to the service flow of a target region in the handover and then a new and unique MFID can be allocated in the target region. The MFID is recognized separately from the FID of the existing system.

Figure 6:
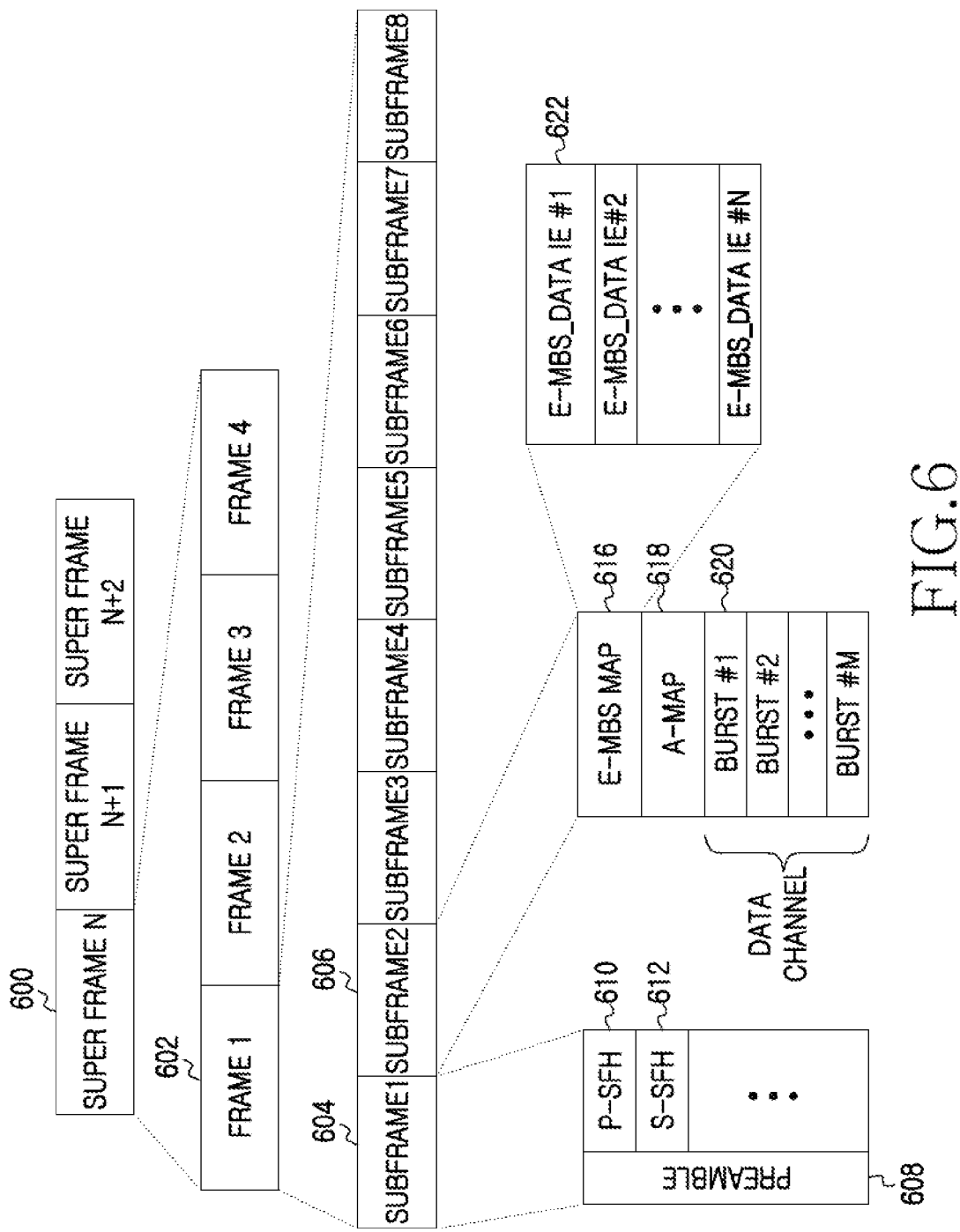
FIG. 6 is a diagram of a frame structure of an IEEE 802.16m system according to an exemplary embodiment of the present invention.

FIG. 6 is a diagram of a frame structure of an IEEE 802.16m system according to an exemplary embodiment of the present invention.

Referring to FIG. 6, the frame structure of the IEEE 802.16m system is hierarchical and includes a super-frame 600, frames 602, and subframes 604 and 606. Each super-frame 600 includes four frames 602. Each of the four frames 602 includes eight subframes 604 and 606. Each subframe 604 and 606 includes a plurality of (e.g., six) OFDMA symbols (not shown).

The first subframe 604 of each super-frame 600 is a super frame header which carries a preamble 608, a P-SFH channel 610, and an S-SFH channel 612. The P-SFH channel 610 includes necessary system information required for communication between the MS and the BS. The P-SFH channel 610 also includes information required to decode the S-SFH channel 612. The S-SFH channel 612 includes, if necessary, other system information.

The subframe 606 includes the E-MBS MAP region 616 by fixed periods, and E-MBS_DATA IEs 622 are transmitted over the E-MBS MAP region 616. By attempting to decode the E-MBS MAP 616 formatted as shown in Table 1, the MS can acquire the type of every multicast service flow in the super-frame, allocation information of the allocated multicast burst (i.e., information relating to the type, the location, and the size), the location of the frame carrying the corresponding multicast burst, the MCS level of the corresponding multicast burst, and the period of the next E-MBS frame contained in the E-MBS_DATA IEs 622 formatted as shown in Table 2. Herein, the E-MBS MAP region 616 conforms to the same encoding rule as the STID defined for the multicast and is encoded and decoding by this rule according to exemplary embodiments of the present invention. The E-MBS MAP region 616 is repeated by fixed periods (e.g., one super-frame), which is referred to as an MBS Scheduling Interval (MSI). The location of the E-MBS MAP region 616 is not fixed but variable according to the system design.

In the other subframes 606, except for the first subframe 604, of the DL interval of each super-frame 600, an A-MAP region 618 exists in every subframe or every two subframes. The remaining region excluding the A-MAP region 618 delivers at least one burst (or packet) 620 including a control message (a signaling message) or traffic. The bursts 620 in the corresponding subframe are allocated by A-MAP IEs (not shown) of the A-MAP region 618. Herein, the A-MAP IE (not shown) includes the type of the unicast flow in the subframe, the allocation information (i.e., information relating to the type, the location, and the size) of the allocated unicast burst, and the MCS level of the corresponding unicast burst. The A-MAP IE (not shown) does not include information as to the multicast. That is, by separating the information representations of the unicast and the multicast, the MS can avoid the unnecessary decoding of the A-MAP IE in every subframe to obtain the multicast information.

Herein, the MS needs to acquire physical information relating to the MBS such as resources carrying the E-MBS MAP and E-MBS in order to fulfill yet another exemplary embodiment of the present invention. For doing so, exemplary embodiments of the present invention provide a new AAI_E-MBS_CFG message. Based on information contained in this new message, the MS can receive the intended E-MBS data with low overhead. The AAI_E-MBS_CFG message can be formatted as shown in Table 4.

Zone_ID field indicates the ID for identifying the corresponding E-MBS zone, and the E-MBS_ZONE_RESOURCE_INDEX field indicates a resource index for specifying the location of the MAP of the corresponding E-MBS zone. The E-MBS MAP time offset field indicates the precise start time of the MAP. The E-MBS MAP $I_{sizeoffset}$ field is contained to support other PHY modes. The E-MBS_SUBFRAME_INDICATOR field indicates the location of the resources carrying the E-MBS based on the end of the frame using the subframes, and the E-MBS_SUBBAND_INDICATOR field indicates the location of the FDD in the E-MBS transmission using the subbands. The E-MBS-CFG_LIFETIME field is inserted to prevent the unnecessary decoding of the MS with respect to the AAI_E-MBS_CFG message periodically broadcast, and indicates that the E-MBS parameters of the AAI_E-MBS_CFG message are valid during a specific MSI. The MS has to analyze the AAI_E-MBS_CFG message just once during the valid time.

Figure 13:
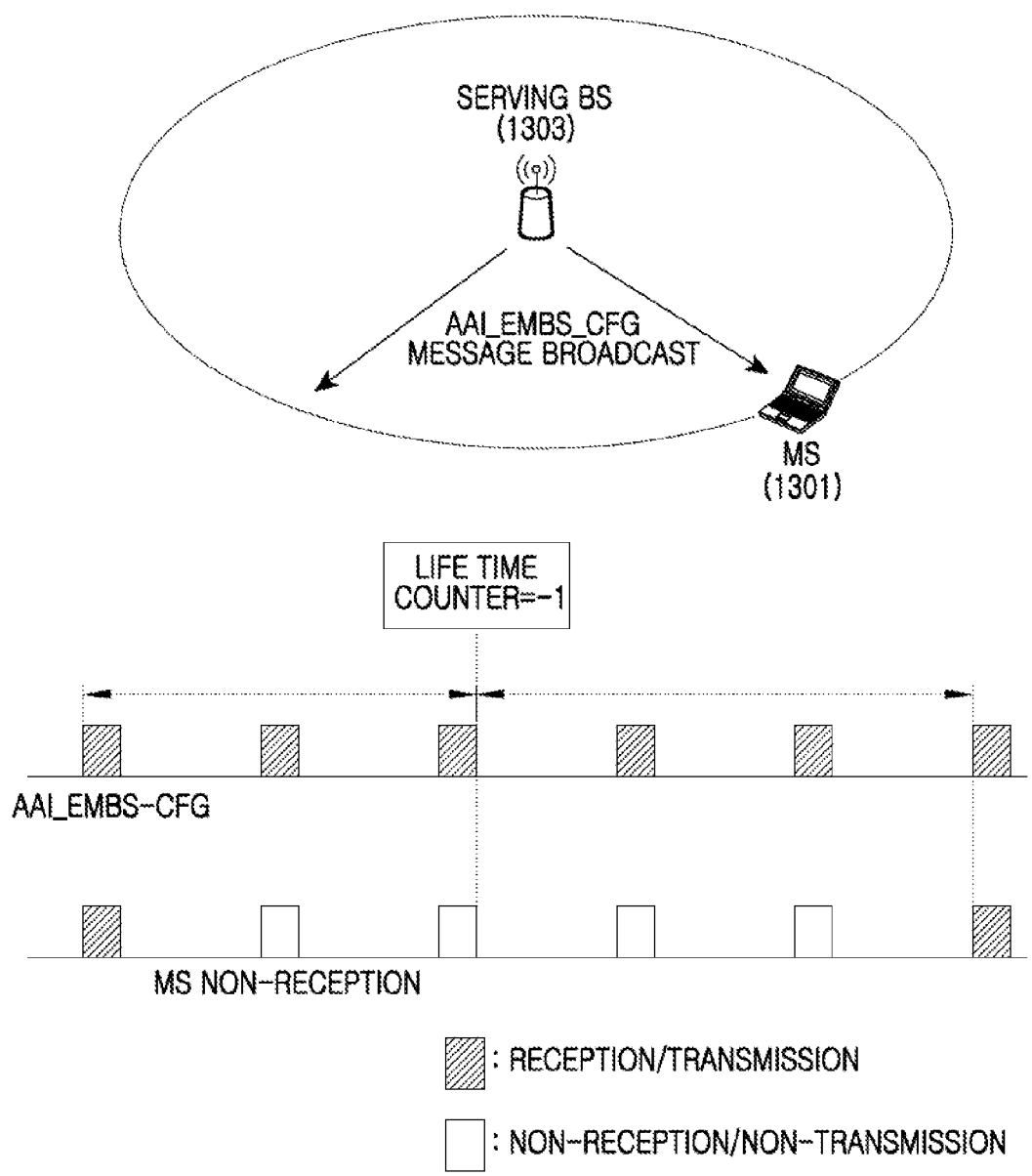
FIG. 13 is a diagram of a method of an MS for receiving a multicast message for receiving parameters relating to a multicast in a broadband wireless access system according to an exemplary embodiment of the present invention.

FIG. 13 is a diagram of a method of an MS for receiving a multicast message for receiving parameters relating to a multicast in a broadband wireless access system according to an exemplary embodiment of the present invention.

TABLE 4

| Syntax | Size(bit) | Notes |
|---|---|---|
| AAI-E-MBS-CFG_Message_Format( ) { | | |
|   Num_E-MBS_Zones | 4 | Number of E-MBS Zones with which the MBS is associated |
|   E-MBS-CFG_LIFETIME | 4 | Indicates the duration in the multiple of MSIs for which the configuration parameters of the E-MBS zone do not change (in unit of MSI) |
|   E-MBS_SUBFRAME_INDICATOR | 3 | Number of subframes reserved for E-MBS within a frame<br>b000: Last 1 subframe of the DL zone<br>b001: Last 2 subframes of the DL zone<br>b010: Last 3 subframes of the DL zone<br>b011: Last 4 subframes of the DL zone<br>b100: Last 5 subframes of the DL zone<br>b101: Last 6 subframes of the DL zone<br>b110: Last 7 subframes of the DL zone<br>b111: Last 8 subframes of the DL zone |
|   E-MBS_SUBBAND_INDICATOR | 5 | Number of subbands reserved for E-MBS in the downlink portion of the frames<br>b0000: subband<br>b0001: 2 subbands<br>b0010: 3 subbands<br>b0011: 4 subbands<br>. . . |
|   for (i = 0; i< Num_E-MBS_Zones; i++) { | | |
|     E-MBS_Zone_ID | 7 | The E-MBS_Zone_ID to which this E-MBS MAP applies. |
|     E-MBS_ZONE_RESOURCE_INDEX | 11 | Indicates the size of E-MBS zone |
|     E-MBS MAP time offset | 5 | In unit of frame |
|     E-MBS MAP $I_{SizeOffset}$ | 5 | |
|   } | | |
| } | | |

Herein, the AAI_E-MBS_CFG message includes the plurality of the fields as shown in Table 4. In Table 4, the Num_E-MBS Zones field indicates the number of E-MBS zones involved with the AAI_E-MBS_CFG message, the E-MBS_

Referring to FIG. 13, to receive the E-MBS service, the MS 1301 needs to acquire relevant information periodically transmitted by a serving BS 1303. The relevant information periodically transmitted by the serving BS 1303 can include information of the E-MBS zone, E-MBS MAP location information, and resource information allocated to the E-MBS zone. Besides, the relevant information can further include physical parameters based on the system. The serving BS 1303 periodically broadcasts the AAI_E-MBS_CFG message of Table 4 to the MS 1301. The AAI_E-MBS_CFG message is encoded by the same encoding rule as the STID defined for the broadcast.

The MS 1301 acquires E-MBS parameter information by decoding the AAI_E-MBS_CFG message of the messages encoded with the STID defined for the broadcast. The MS detecting the transmission of the E-MBS data corresponding to its E-MBS zone in the corresponding frame based on the E-MBS parameter information, acquires from the E-MBS-CFG_LIFETIME field that the corresponding parameter is valid up to the specific MSI, and relies on the decoding parameter information until the valid frame. Hence, the MS does not attempt to analyze the AAI_E-MBS_CFG message any more. By setting a LIFETIME counter, the MS decreases the LIFE TIME indicated by the LIFETIME counter by one every time one MSI passes by.

Next, the MS 1301 attempts to decode the E-MBS MAP using the location information of the E-MBS MAP of the AAI_E-MBS_CFG message, and receives the E-MBS according to an exemplary embodiment. If the MS must continue receiving the E-MBS, it needs to decode the AAI_E-MBS_CFG message using the broadcast STID in every transmission period, which can cause considerable overhead. The use of the E-MBS-CFG_LIFETIME field avoids the unnecessary message analysis through the parameter confidence interval, aids in efficient E-MBS reception, and reduces power consumption.

Figure 14:
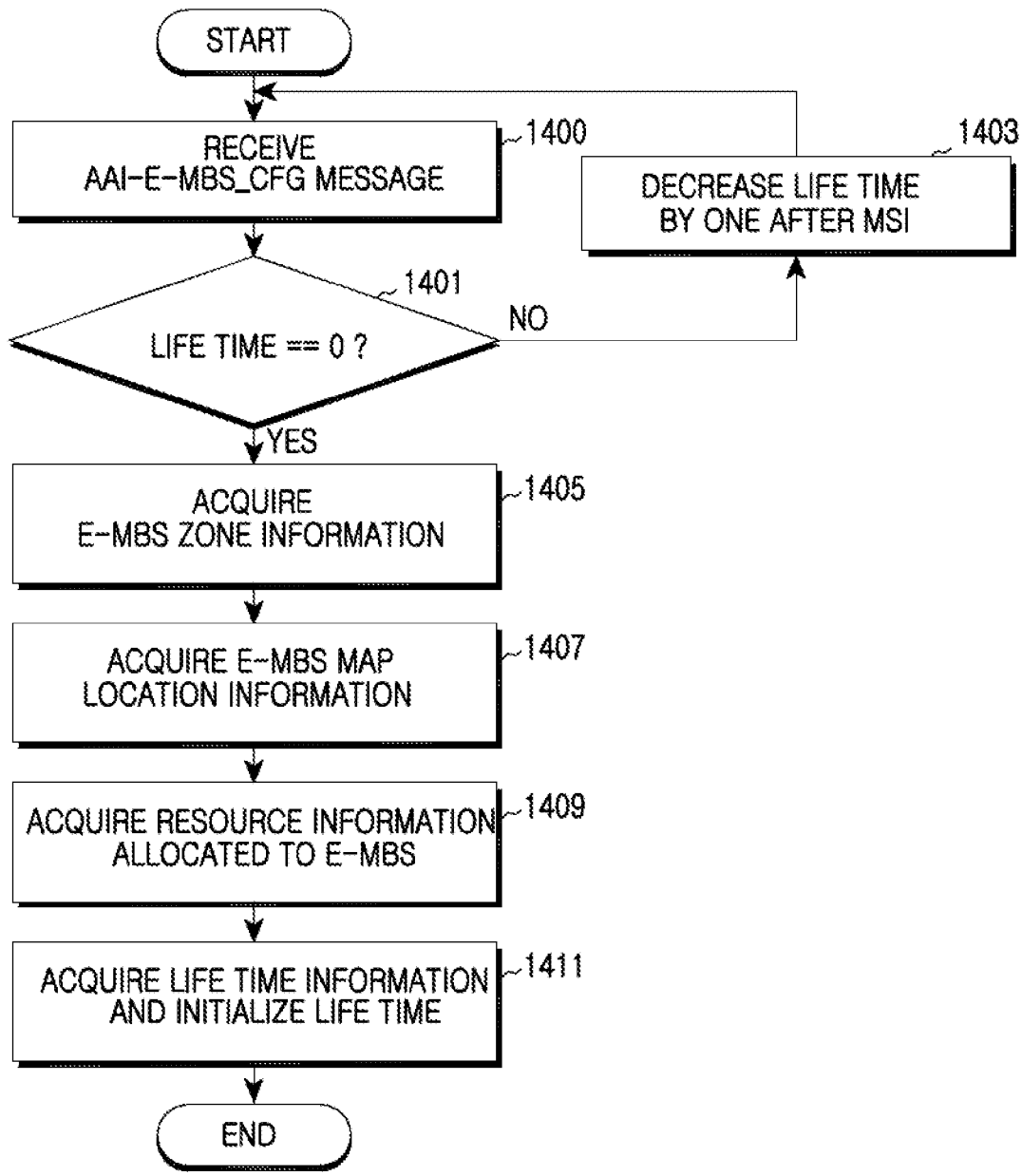
FIG. 14 is a flowchart of a method of an MS for receiving a multicast message for receiving parameters relating to a multicast in a broadband wireless access system according to an exemplary embodiment of the present invention.

FIG. 14 is a flowchart of a method of an MS for receiving a multicast message for receiving parameters relating to a multicast in a broadband wireless access system according to an exemplary embodiment of the present invention.

Referring to FIG. 14, the MS receives the AAI-E-MBS_CFG message periodically transmitted from the BS in step 1400, and determines whether the LIFE TIME indicated by its LIFETIME counter is zero in step 1401. Herein, the MS can determine based on its LIFETIME counter whether it is necessary to decode the received AAI-E-MBS_CFG message.

If it is determined in step 1401 that the LIFE TIME indicated by the LIFETIME counter is not zero, the MS determines that there is no need to decode the AAI-E-MBS_CFG message, decreases the LIFE TIME indicated by the LIFETIME counter after the valid MSI by one in step 1403, and returns to step 1400 to repeat the subsequent steps.

In contrast, if it is determined in step 1401 that the LIFE TIME indicated by the LIFETIME counter is zero, the MS acquires the information of its E-MBS zone by decoding and analyzing the AAI-E-MBS_CFG message in step 1405. Thus, the MS can acquire its service E-MBS zone.

In step 1407, the MS acquires the corresponding MAP location information through the AAI-E-MBS_CFG message. Thus, the MS can locate the E-MBS MAP corresponding to the acquired MBS-zone.

In step 1409, the MS acquires the resource information allocated to the E-MBS within the entire frame using the AAI-E-MBS_CFG message. Using the acquired resource information allocated to the E-MBS, the MS can determine the resource allocated to the E-MBS by counting the value recorded in the E-MBS_SUBFRAME_INDICATOR field from the end of the subframes allocated to the downlink within one frame in order. In addition, the MS can determine the E-MBS location in the FDD using the value recorded in the E-MBS_SUBBAND_INDICATOR field.

In step 1411, the MS acquires the LIFE TIME information from the E-MBS-CFG_LIFETIME field of the AAI-E-MBS_CFG message, acquires the valid MSI of the information obtained in steps 1405, 1407 and 1409 based on the acquired LIFE TIME information, and initializes the value of the LIFETIME counter after the valid MSI.

Next, the MS finishes this process.

The MS acquiring the E-MBS parameter information from the AAI-E-MBS_CFG message sets the E-MBS service through a series of the negotiation procedures with the BS for the sake of the E-MBS flow establishment. For doing so, exemplary embodiments of the present invention provide an AAI_DSA-REQ/RSP message of Table 5 and Table 6. Herein, the AAI_DSA-REQ message can be transmitted by the BS or the MS.

TABLE 5

| Syntax | Size | Notes |
|---|---|---|
| AAI-DSA_REQ Message format( ) | | |
| Control Message Type | 8 | |
| FID Change Count | 4 | The change count of this transaction assigned by the sender. If new transaction is started, FID Change Count is incremented by one (modulo 16) by the sender. |
| Uplink/Downlink Indicator | 1 | 0: uplink; 1: downlink |
| QoS parameter set type | 8 | Bit 0: Provisioned Set Bit 1: Admitted Set Bit 2: Active Set |
| Service Flow Parameters | TBD | The number of included E-MBS DATA IEs |
| Convergence Sublayer Parameter Encoding | TBD | |
| E-MBS Service | 12 | Indicates whether the MBS service being requested or provided for the connection that is being setup. 0: No available E-MBS 1: E-MBS in Serving BS Only 2: E-MBS in a multi-BS Zone supporting macro-diversity 3: E-MBS in a multi-BS Zone not supporting macro-diversity |
| E-MBS Zone ID | 7 | Indicates an E-MBS zone where the connection for associated service flow is valid. |
| E-MBS Service Flow Parameter | variable | Mapping of E-MBS ID and FID |
| Physical Carrier Index | 6 | Target carrier which the MS switches or is redirected by BS to, only included in BS initiated DSA-REQ |

TABLE 6

| Syntax | Size | Notes |
|---|---|---|
| AAI-DSA_RSP Message format( ) | | |
| Control Message Type | 8 | |
| FID Change Count | 4 | The change count of this transaction assigned by the sender. If new transaction is started, FID Change Count is incremented by one (modulo 16) by the sender. |
| Confirmation Code | 1 | Zero indicates the request was successful. Nonzero indicates failure |
| E-MBS Service | 12 | Indicates whether the MBS service being requested or provided for the connection that is being setup. |

TABLE 6-continued

| Syntax | Size | Notes |
| --- | --- | --- |
| | | 0: No available E-MBS |
| | | 1: E-MBS in Serving BS Only |
| | | 2: E-MBS in a multi-BS Zone supporting macro-diversity |
| | | 3: E-MBS in a multi-BS Zone no supporting macro-diversity |
| E-MBS Zone ID | 7 | Indicates an E-MBS zone where the connection for associated service flow is valid. |
| E-MBS Service Flow Parameter | variable | Mapping of E-MBS ID and FID |
| Physical Carrier Index | 6 | Target carrier which the MS switches or is redirected by BS to, only included in BS initiated DSA-REQ |

Herein, the E-MBS Service field indicates whether the E-MBS service is requested or provided, and the E-MBS Zone ID field indicates the E-MBS zone of the valid connection associated with the service flow. The E-MBS Service Flow Parameter field includes the mapping of the E-MBS ID and the FID. The Physical Carrier Index indicates a target carrier switched by the MS or a target carrier redirected by the BS when the E-MBS dedicated carrier exists.

Figure 7:
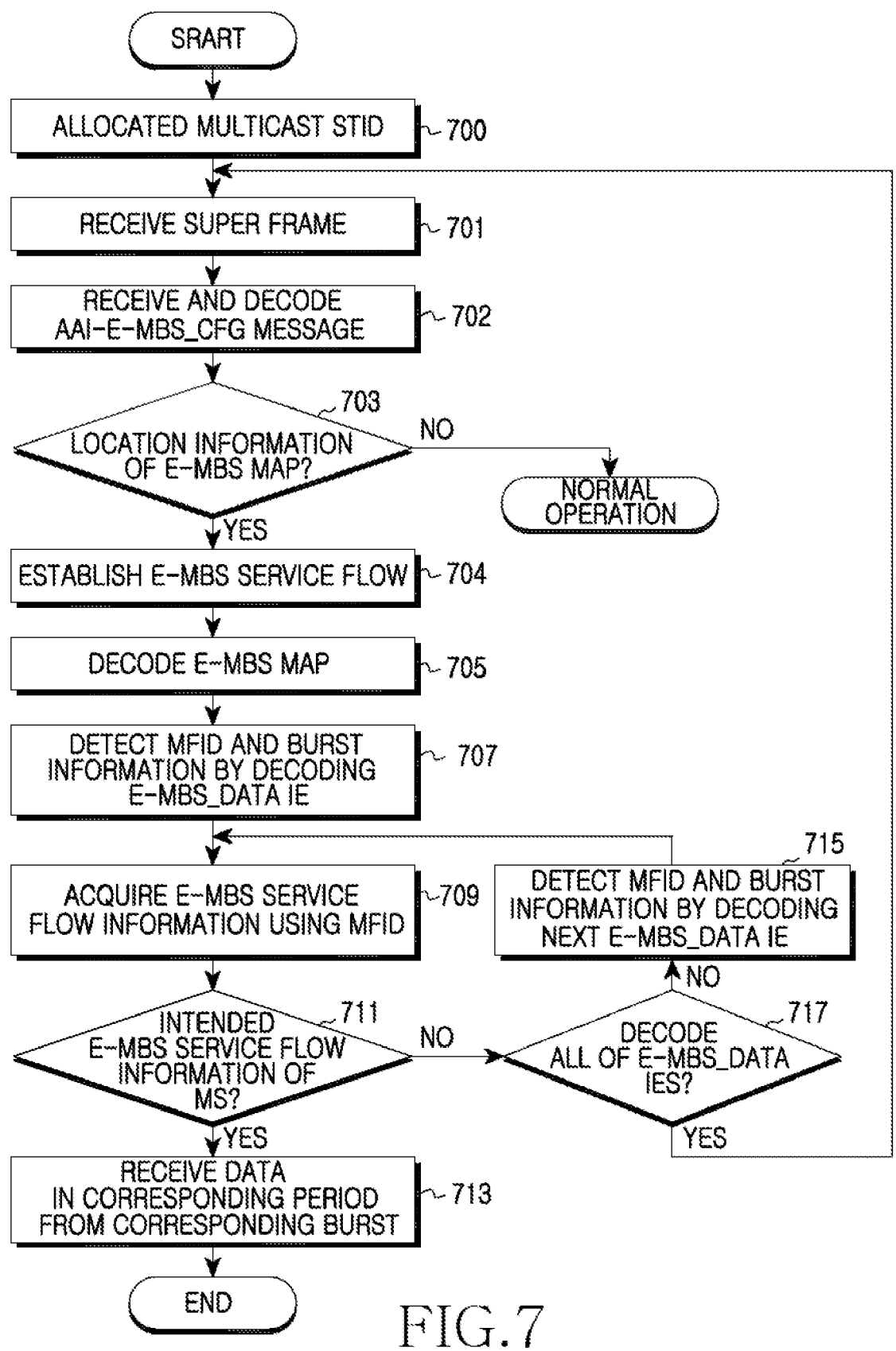
FIG. 7 is a flowchart of a method of an MS for receiving a multicast message for obtaining E-MBS service flow information by decoding an MFID of an E-MBS_Data Information Element (IE) of an E-MBS MAP region in a broadband wireless access system according to an exemplary embodiment of the present invention.

FIG. 7 is a flowchart of a method of an MS for receiving a multicast message for obtaining E-MBS service flow information by decoding an MFID of E-MBS_Data IE of an E-MBS MAP region in a broadband wireless access system according to an exemplary embodiment of the present invention.

Referring to FIG. 7, in step 700, the MS completes the registration with the BS and is allocated the multicast STID from the BS through negotiation. Herein, the STID can be a preset value before the MS and the BS perform the registration. In this case, the multicast STID can be allocated without the negotiation. Herein, the registration is to exchange the E-MBS capabilities between the MS and the BS and can be completed by sending and receiving AAI-REG_REQ/AAI-REG_RES messages.

The MS receives the super-frame in step 701, and receives and decodes the AAI-E-MBS_CFG message in step 702. Herein, the AAI-E-MBS_CFG message includes the information of the E-MBS zone of the MS, the location information of the E-MBS MAP, and the information relating to the resource allocated to the E-MBS in the frame.

In step 703, the MS determines whether the decoded AAI-E-MBS_CFG message includes the location information of the E-MBS MAP.

If it is determined in step 703 that the decoded AAI-E-MBS_CFG message does not include the location information of the E-MBS MAP, the MS performs the normal operation and conducts the existing process for the unicast.

On the other hand, if it is determined in step 703 that the decoded AAI-E-MBS_CFG message includes the location information of the E-MBS MAP, the MS recognizes the presence of the E-MBS MAP to decode in the received super-frame, and establishes the E-MBS service flow, that is, the multicast service flow through a series of negotiations with the BS in step 704. Herein, the E-MBS service flow can be established by sending and receiving the AAI_DSA-REQ/RSP messages between the MS and the BS.

In step 705, the MS decodes the E-MBS MAP according to the encoding rule of the allocated multicast STID based on the location information of the E-MBS MAP.

In step 707, the MS decodes one of the E-MBS_Data IEs of the E-MBS MAP, and detects the MFID and the burst information contained in the E-MBS_Data IE according to the decoding. Herein, the burst information indicates the information relating to the burst in Table 2, that is, indicates the type of every multicast service flow in the super-frame, the allocation information (i.e., the information as to the type, the location, and the size) of the allocated multicast burst, the location of the frame carrying the corresponding multicast burst, the MCS level of the corresponding multicast burst, and the period of the next E-MBS frame.

Next, the MS acquires the E-MBS service flow information using the detected MFID in step 709 and determines whether the E-MBS service flow information corresponds to its intended multicast service flow in step 711. That is, the MS determines whether the acquired E-MBS service flow information corresponds to the established multicast service flow.

If it is determined in step 711 that the E-MBS service flow information does not correspond to the intended multicast service flow, the MS determines whether all of the E-MBS_Data IEs of the E-MBS MAP are decoded in step 717.

If it is determined in step 717 that all of the E-MBS_Data IEs of the E-MBS MAP are decoded, the MS returns to step 701 and repeats the subsequent steps.

In contrast, if it is determined in step 717 that all of the E-MBS_Data IEs of the E-MBS MAP are not decoded, the MS decodes one of the undecoded E-MBS_Data IEs of the E-MBS MAP, detects the MFID and the burst information of the E-MBS_Data IE according to the decoding in step 715, and then returns to step 709 to repeat the subsequent steps.

If it is determined in step 711 that the E-MBS service flow information corresponds to the intended multicast service flow, the MS receives data in the corresponding period through the burst transmitted from the BS in the E-MBS zone using the detected burst information in step 713.

Next, the MS finishes this process.

Figure 8:
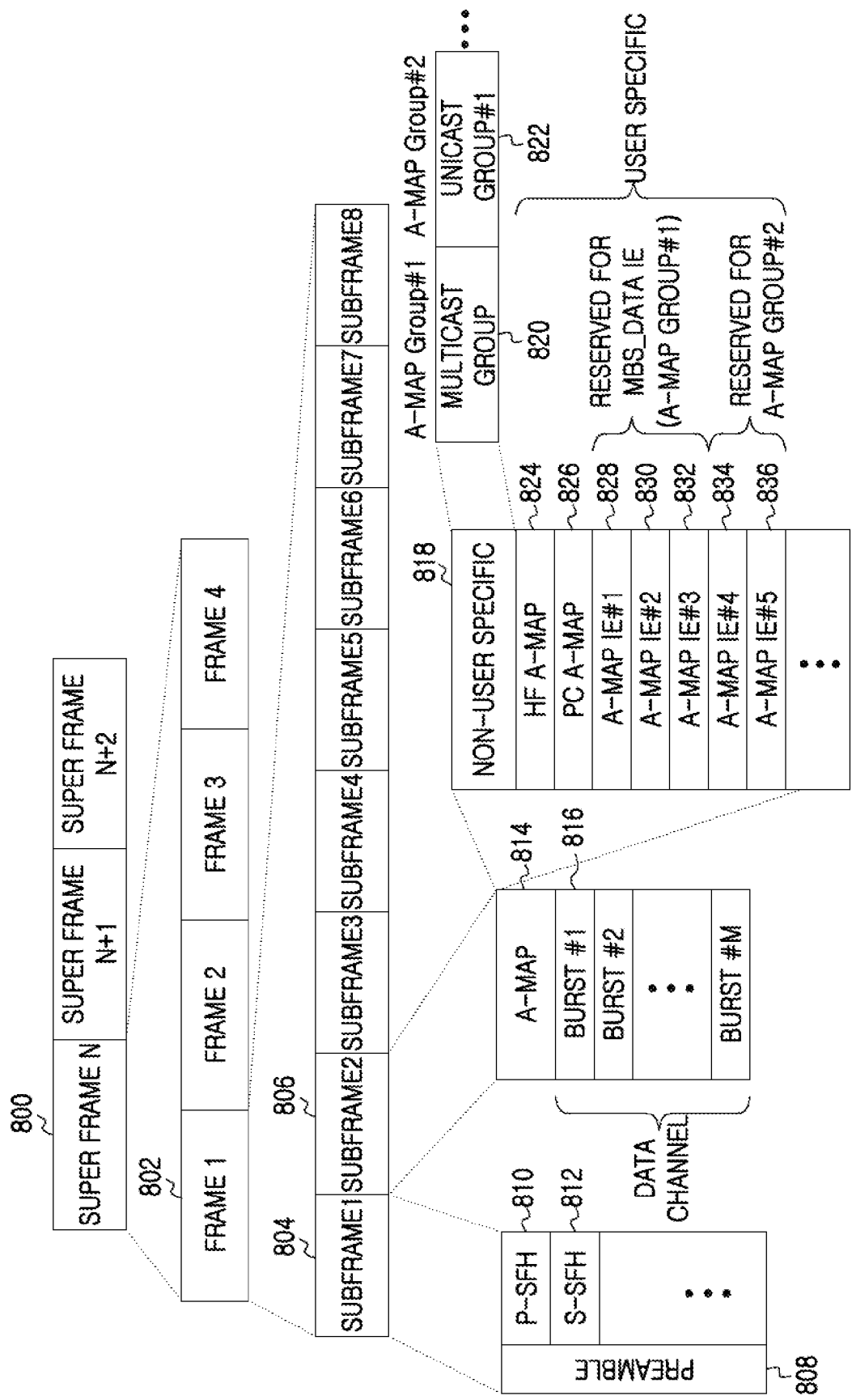
FIG. 8 is a diagram of a frame structure of an IEEE 802.16m system according to an exemplary embodiment of the present invention.

FIG. 8 is a diagram of a frame structure of an IEEE 802.16m system according to an exemplary embodiment of the present invention.

Referring to FIG. 8, a frame structure of the IEEE 802.16m system of FIG. 8 is substantially the same as in FIG. 1. Yet, a difference lies in the A-MAP region 814. Hereinafter, only the structure of the A-MAP region 814 is described.

The A-MAP region 814 includes a non-user specific region 818 and a user-specific region. The non-user specific region 818 includes information indicating the size of the A-MAP region 814. Based on the size information of the A-MAP region 814, the boundary of the A-MAP region 814 can be obtained.

Herein, the information indicating the size of the A-MAP region 814 is formatted as shown in Table 7. To indicate the size of the A-MAP region 814, the non-user specific region 818 contains a plurality of A-MAP groups 820 and 822. By indicating the number of the A-MAP IEs belonging to the corresponding group using the A-MAP groups 820 and 822, the total size of the A-MAP region 814 can be represented. For example, the plurality of the A-MAP groups can include a multicast group 820, a unicast group #1 822, and a unicast group #2 (not shown). Based on the number of the A-MAP IEs belonging to the multicast group 820, the presence or absence of the multicast data transmitted in the corresponding subframe can be determined. When the number of the A-MAP IEs belonging to the multicast group 820 is three and the number of the A-MAP IEs belonging to the unicast group #1 822 is two, the MS can determine that the A-MAP IE #1 828, the A-MAP IE #2 830, and the A-MAP IE #3 832 include the allocation information for the multicast data transmission, and that the A-MAP IE #4 834 and the A-MAP IE #5 836 include the allocation information for the unicast data transmission.

TABLE 7

| Syntax | Size | Notes |
|---|---|---|
| A-MAP size | TBD | Indicate the number of A-MAP IEs in each A-MAP group |

As shown in Table 7, the information indicating the size of the A-MAP region 814 is represented as the number of the A-MAP IEs belonging to the corresponding group per A-MAP group. The size of the individual A-MAP IE of each group is known through the advance negotiation between the MS and the BS. The E-MBS_Data IE according to exemplary embodiments of the present invention forms the A-MAP group #1 through the advance negotiation. Herein, the E-MBS_Data IE is decoded in the same manner as the non-user specific region 818, and is encoded in the same manner as the multicast STID according to exemplary embodiments. The location of the E-MBS_Data IE is not fixed but variable according to the system. When the E-MBS_Data IE takes a different encoding scheme from the non-user specific region 818, the multicast STID and the CRC according to exemplary embodiments are scrambled and inserted as the fields of the E-MBS_Data IE. The MS can obtain the STID by descrambling the CRC and then decode the E-MBS_Data IE using the obtained STID.

The user-specific region includes an HF A-MAP 824, a PC A-MAP 826, and A-MAP IEs 828 through 836. The HF A-MAP 824 includes feedback information of the HARQ, the PC A-MAP 826 includes the power level, and the A-MAP IEs 828 through 836 include the allocation information for the corresponding burst 816. The E-MBS_Data IE according to exemplary embodiments of the present invention lies in the region of the A-MAP IE. Herein, the E-MBS_Data IE is formatted as shown in Table 2, without the E-MBS Frame/Subframe offset field and the Allocation Period field. Accordingly, as decoding the A-MAP region 814 in every frame or in every other frame, the MS determines the presence or absence of the multicast data in the non-user specific region 818. Using the E-MBS_Data IE in the A-MAP IE regions 828, 830, and 832, the MS can acquire the type of every multicast service flow in the super-frame, the allocation information (i.e., the information as to the type, the location, and the size) of the allocated multicast burst, the location of the frame carrying the corresponding multicast burst, and the MCS level of the corresponding multicast burst.

Figure 9:
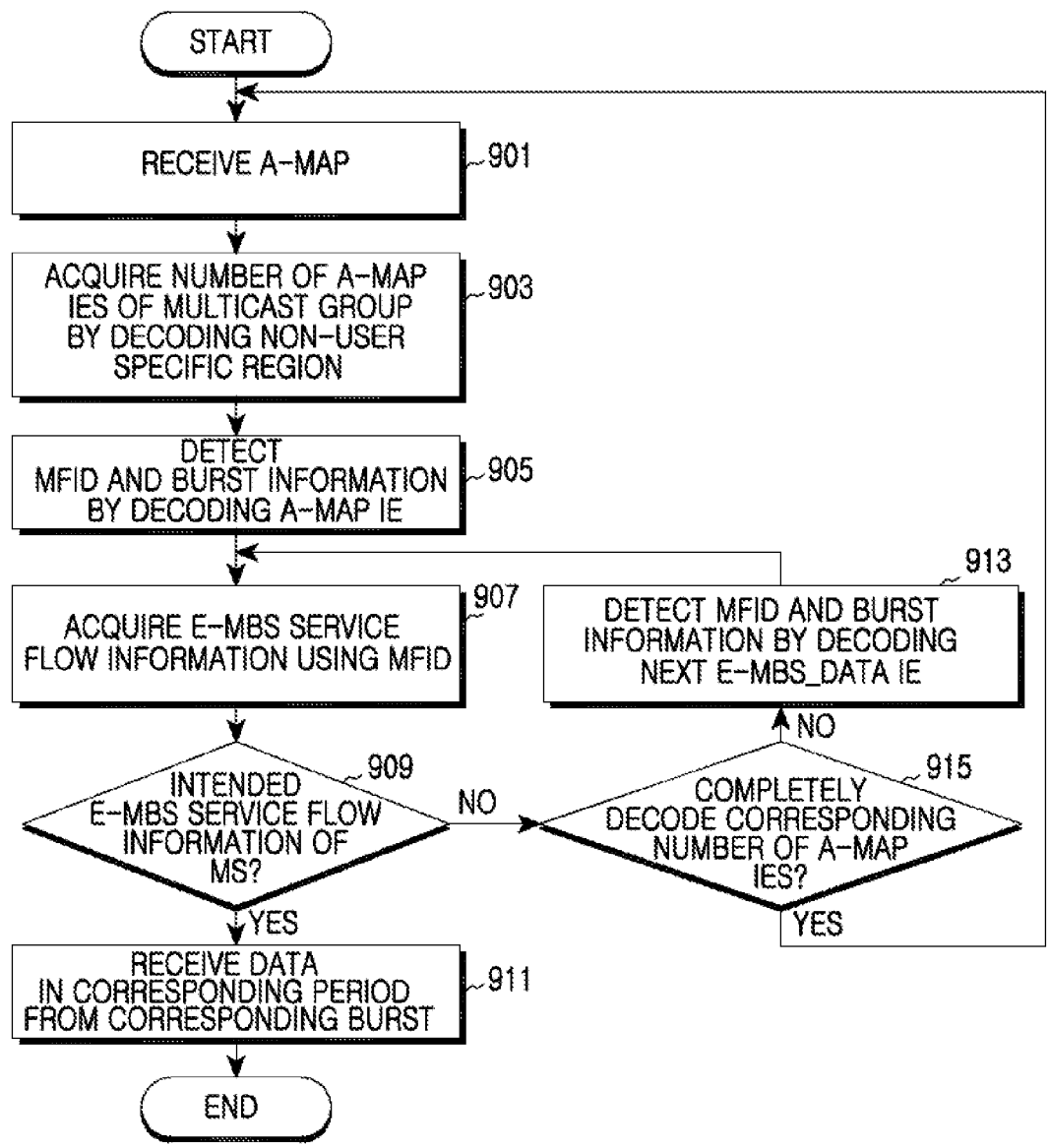
FIG. 9 is a flowchart of a method of an MS for receiving a multicast message for obtaining E-MBS service flow information by decoding an MFID of an A-MAP IE belonging to a multicast group among A-MAP IEs of an A-MAP region in the broadband wireless access system according to an exemplary embodiment of the present invention.

FIG. 9 is a flowchart of a method of an MS for receiving a multicast message for obtaining E-MBS service flow information by decoding an MFID of an A-MAP IE belonging to a multicast group among A-MAP IEs of an A-MAP region in a broadband wireless access system according to an exemplary embodiment of the present invention.

Referring to FIG. 9, the MS completes the registration with the BS and is allocated the multicast STID from the BS through the negotiation. Herein, the STID can be a preset value before the MS and the BS perform the registration. In this case, the multicast STID can be allocated without the negotiation.

The MS receives the A-MAP in step 901, and acquires the number of the A-MAP IEs belonging to the multicast group by decoding the non-user specific region in the received A-MAP in step 903.

In step 905, the MS decodes one of the A-MAP IEs belonging to the multicast group, and detects the MFID and the burst information from the A-MAP IE according to the decoding. Herein, the burst information indicates the information relating to the burst in Table 2, that is, the type of every multicast service flow in the super-frame, the allocation information (i.e., the information as to the type, the location, and the size) of the allocated multicast burst, the location of the frame carrying the corresponding multicast burst, the MCS level of the corresponding multicast burst, and the period of the next E-MBS frame.

The MS obtains the E-MBS service flow information using the detected MFID in step 907, and determines whether the E-MBS service flow information corresponds to its intended multicast service flow in step 909.

If it is determined in step 909 that the E-MBS service flow information does not correspond to the intended multicast service flow, the MS determines in step 915 whether the number of A-MAP IEs that have been decoded is the same as the number of A-MAP IEs belonging to the multicast group.

If it is determined in step 915 that the number of A-MAP IEs that have been decoded is the same as the number of A-MAP IEs belonging to the multicast group, the MS returns to step 901 to repeat the subsequent steps.

On the other hand, if it is determined in step 915 that the number of A-MAP IEs that have been decoded is not the same as the number of A-MAP IEs belonging to the multicast group, the MS decodes one of the undecoded A-MAP IEs belonging to the multicast group and detects the MFID and the burst information of the A-MAP IE according to the decoding in step 913, and returns to step 907.

In contrast, if it is determined in step 909 that the E-MBS service flow information corresponds to the intended multicast service flow, the MS receives data in the corresponding period over the corresponding burst using the detected burst information in step 911.

Next, the MS finishes this process.

While the single STID is dedicated to the multicasting and the service is distinguished using the MFID, the E-MBS MAP, or the A-MAP in those exemplary embodiments of the present invention, the STID can be divided into the multicast STID and the unicast STID and the service can be distinguished by allocating the multicast STID (i.e., the E-MBS ID). For example, the STID of 0xF00~0xFFF can be mapped to the E-MBS ID for the multicast, and the other STIDs can be mapped to the STIDs for the unicast as shown in Table 8.

TABLE 8

| STID (12 bit) | Note |
|---|---|
| 0xF00 ... (255) 0xFFF | For Multicast: E-MBS ID (Each STID means each service) |
| Others | For Unicast |

Herein, each E-MBS ID is mapped to the service provided in order. The STID range and the number are not fixed and the STID mapping scheme can vary according to the system. In this case, the STID can be used to assist the authentication of the user as well as to distinguish the channel. Since the service is distinguished with the STID, unsubscribed services can be blocked only using the STID.

Figure 10:
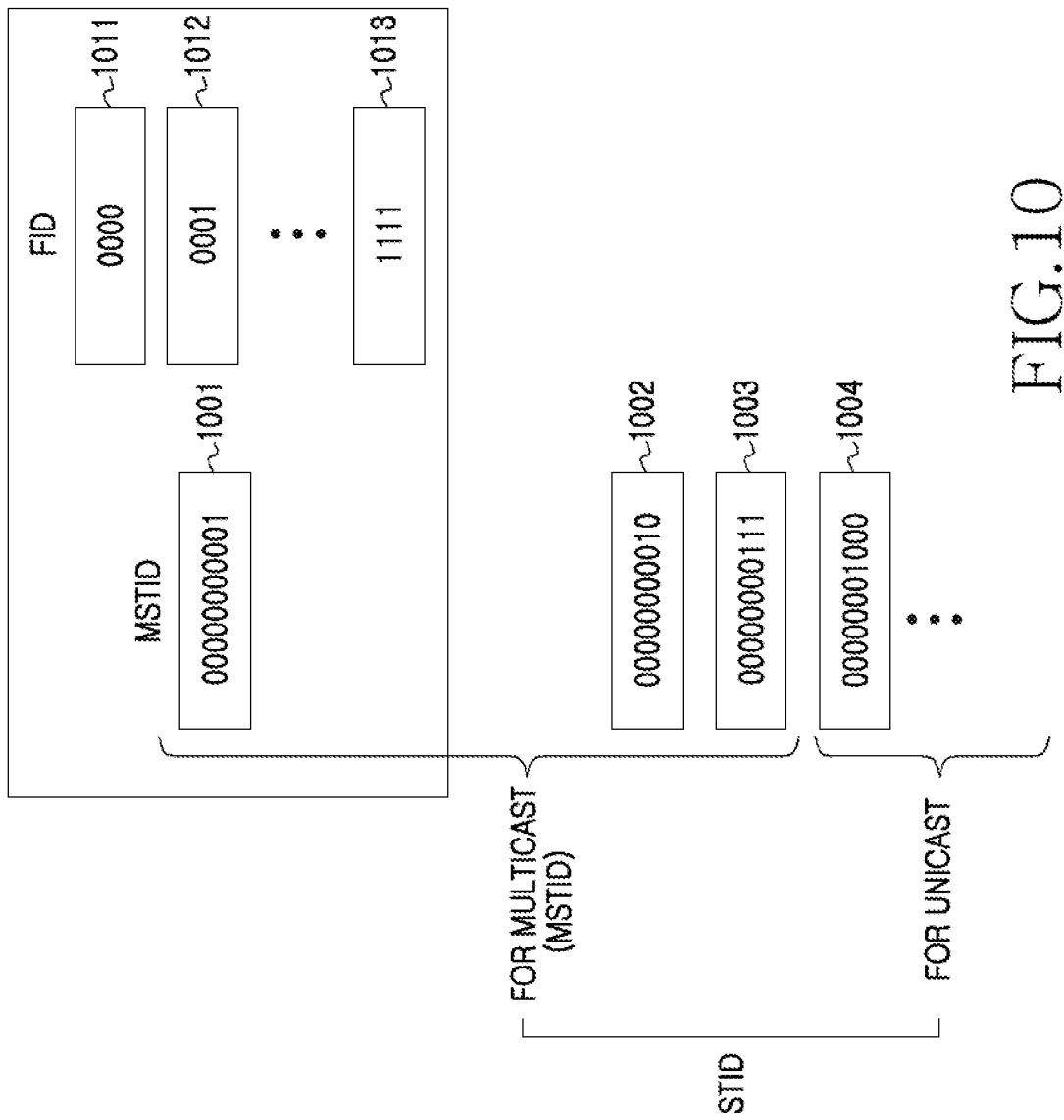
FIG. 10 is a diagram of a method of an MS for receiving a multicast message for obtaining E-MBS service flow information by decoding a multicast STation IDentifier (STID) (i.e., E-MBS ID) and FID in a broadband wireless access system according to an exemplary embodiment of the present invention.

FIG. 10 is a diagram of a method of an MS for receiving a multicast message for obtaining E-MBS service flow information by decoding a multicast STID (i.e., E-MBS ID) and an FID in a broadband wireless access system according to an exemplary embodiment of the present invention.

Referring to FIG. 10, among the STIDs, a certain number of the STIDs are allocated for the multicast (i.e., the E-MBS ID) and the other STIDs are allocated for the unicast. To lower the descrambling complexity and the CRC error probability, the minimum STID can be allocated for the multicast. For example, the STIDs of '00000000001' 1001, '00000000010' 1002 and '00000000111' 1003 can be allocated as the E-MBS ID, and the other STIDs including the '00000001000' 1004 can be allocated for the unicast. As such, some of the STIDs are allocated as the E-MBS ID, and the existing FID 4 bits 1011, 1012 and 1013 are used for the channel. Herein, the E-MBS ID represents the independent service group, and the first service classified with the E-MBS ID is subdivided with the FID. Hence, using 16 services belonging to one E-MBS ID and classified with the FID and 8 E-MBS IDs having this FID, information regarding 128 different services can be represented.

Figure 11:
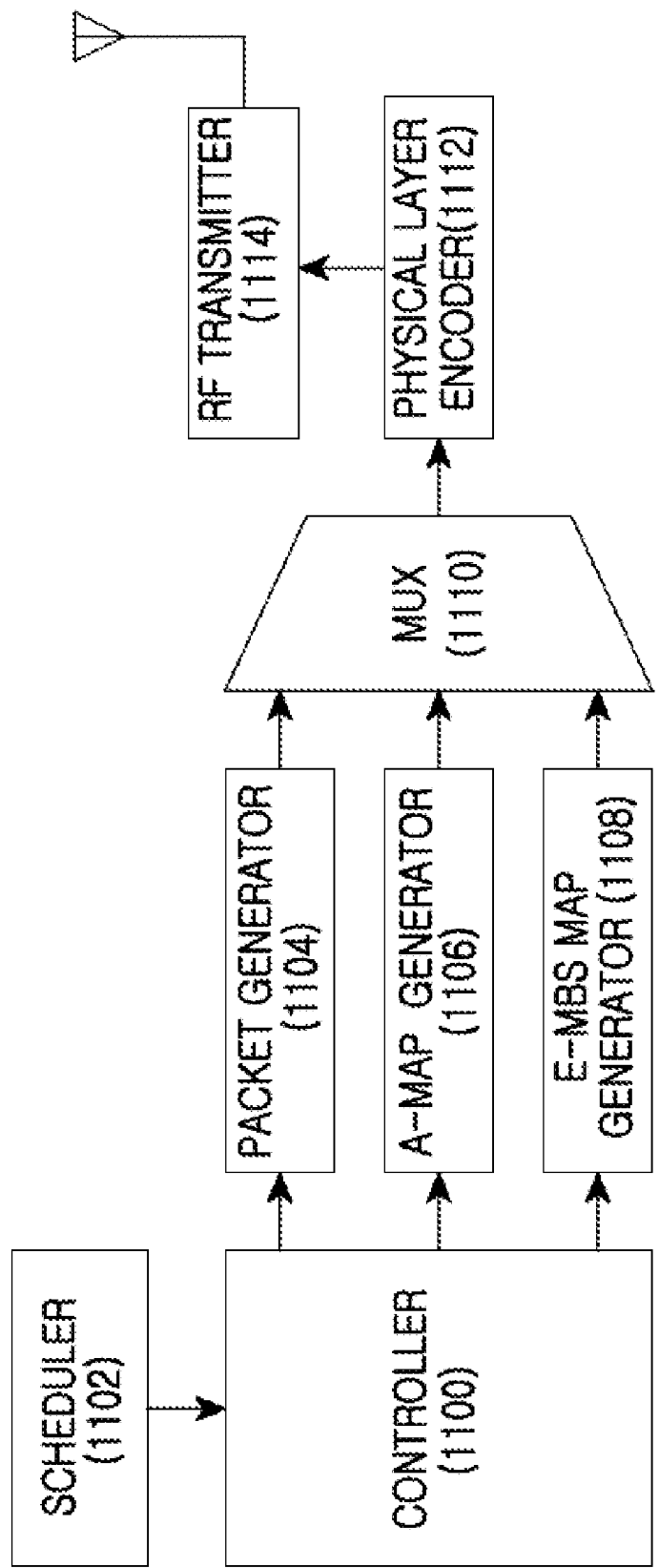
FIG. 11 is a block diagram of a Base Station (BS) in a broadband wireless access system according to an exemplary embodiment of the present invention.

FIG. 11 is a block diagram of a BS in a broadband wireless access system according to an exemplary embodiment of the present invention.

Referring to FIG. 11, the BS includes a controller 1100, a scheduler 1102, a packet generator 1104, an A-MAP generator 1106, an E-MBS MAP generator 1108, a multiplexer (MUX) 1110, a physical layer encoder 1112, and a Radio Frequency (RF) transmitter 1114.

The scheduler 1102 schedules data to transmit and provides the scheduling result to the controller 1100. Herein, it is assumed the multicast data is scheduled as the data to transmit.

The controller 1100 forwards the scheduling result provided from the scheduler 102 to the packet generator 1104 and the A-MAP generator 1106. In addition, the controller 1100 may forward the scheduling result to the E-MBS MAP generator 1108 in various exemplary embodiments of the present invention.

According to the scheduling result, the packet generator 1104 generates data packets to transmit using the scheduled data. In one exemplary embodiment, the packet generator 1104 generates the payload including the scheduled data and generates the MAC header including the FID field, the EH field, and the Length field. When the scheduled data is the multicast data, the packet generator 1104 can generate the MAC PDU including the generated MAC header, the extended header, and the payload by generating the extended header including the Type field and the MFID field. In another exemplary embodiment, the packet generator 1104 can generate the payload including the scheduled data, generate the MAC header including the MFID field and the Length field, and generate the MAC PDU including the generated MAC header and the payload.

The A-MAP generator 1106 generates and outputs the A-MAP IE including the allocation information of the burst for the packets to transmit according to the scheduling result. In yet another exemplary embodiment, the A-MAP generator 1106 generates and outputs the A-MAP IE including the allocation information of the burst for the unicast packets to transmit according to the scheduling result. According to the scheduling result, the E-MBS MAP generator 1108 generates and outputs the E-MBS_Data IE including the allocation information of the burst for the multicast packets to transmit. In so doing, the E-MBS_Data IE includes the MFID including the E-MBS service flow information. In still another exemplary embodiment, the A-MAP generator 1106 generates and outputs the A-MAP IEs including the allocation information of the bursts for the unicast packet and the multicast packet to transmit according to the scheduling result. In this case, the E-MBS MAP generator 1108 is unnecessary, and the A-MAP IE including the allocation information of the bursts for the multicast packet includes the MFID including the E-MBS service flow information. The A-MAP generator 1106 transmits the information relating to the number of the A-MAP IEs including the allocation information of the bursts for the multicast packet to the MS through the multicast group of the non-user specific region, and transmits the information relating to the number of the A-MAP IEs including the allocation information of the bursts for the unicast packet to the MS through the unicast group of the non-user specific region.

The MUX 1110 selects and outputs the packets fed from the packet generator 1104, the A-MAP generator 1106, and the E-MBS MAP generator 1108 by the preset rule.

The physical layer encoder 1112 generates and outputs a preamble signal transmitted at the front of the frame, generates and outputs the P-SFH signal and the S-SFH signal, and encodes and outputs the packets from the MUX 1110 in the physical layer. Herein, the physical layer encoder 1112 can include a channel encoding block, a modulation block, and so on. When an OFDM system is given, the channel encoding block can include a channel encoder, an interleaver, and a modulator. The modulation block can include an Inverse Fast Fourier Transform (IFFT) operator for loading the transmit data to a plurality of orthogonal subcarriers.

The RF transmitter 1114 converts a baseband signal output from the physical layer encoder 1112 to an analog signal, converts the analog signal to an RF signal, and transmits the RF signal over an antenna.

According to an exemplary embodiment of the present invention, the BS can further include a message transmitter and receiver. The message transmitter and receiver generates and sends the AAI-REG_REQ message to the MS for the E-MBS capability exchange between the MS and the BS, and receives and processes the AAI-REG_RSP message from the MS. The message transmitter and receiver generates and sends the AAI-E-MBS_CFG message to the MS. Herein, the AAI-E-MBS_CFG message includes the information of the E-MBS zone of the MS, the location of the E-MBS MAP, and the resource information allocated to the E-MBS in the entire frame. When the AAI-E-MBS_CFG message contains the location information of the E-MBS MAP, the message transmitter and the receiver generates and sends the AAI_DSA-REQ message to the MS for the E-MBS service flow establishment between the MS and the BS, and receives and processes the AAI_DSA-RSP message from the MS.

Figure 12:
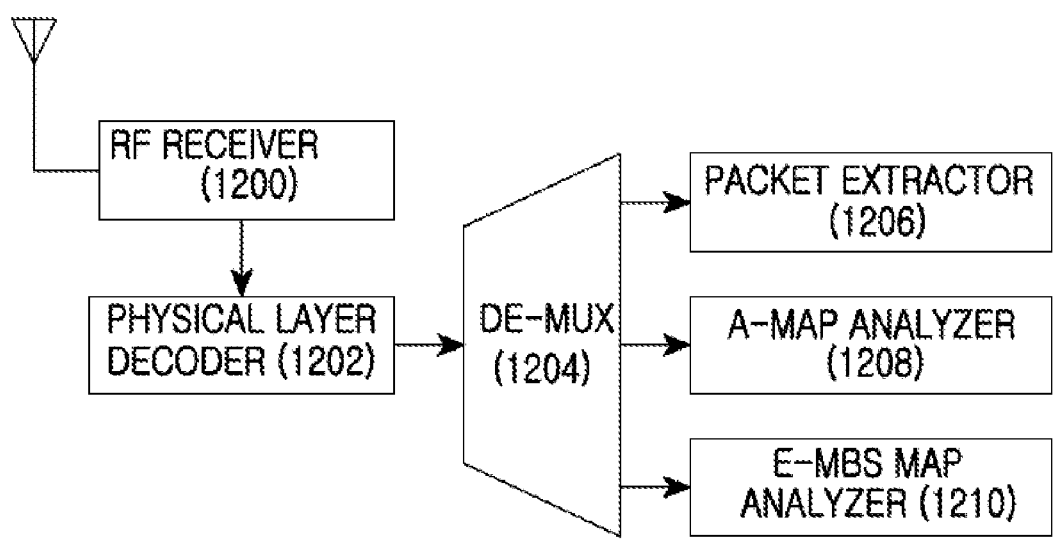
FIG. 12 is a block diagram of an MS in a broadband wireless access system according to an exemplary embodiment of the present invention.

FIG. 12 is a block diagram of an MS in a broadband wireless access system according to an exemplary embodiment of the present invention.

Referring to FIG. 12, the MS includes an RF receiver 1200, a physical layer decoder 1202, a demultiplexer (DE-MUX) 1204, a packet extractor 1206, an A-MAP analyzer 1208, and an E-MBS MAP analyzer 1210.

The RF receiver 1200 converts the RF signal received over an antenna to the baseband signal, and converts the baseband signal to the digital signal.

The physical layer decoder 1202 acquires the synchronization using the preamble signal transmitted at the front of the frame, acquires the system information required for the communication between the MS and the BS using the P-SFH signal and the S-SFH signal received, decodes the digital signal output from the RF receiver 1200 in the physical layer, and outputs the packets to the DE-MUX 1204. Herein, the physical layer decoder 1202 can include a demodulation block, a channel decoding block, and so on. When the OFDM system is given, the demodulation block can include an FFT operator for extracting the data from the subcarriers, and the channel decoding block can include a demodulator, a deinterleaver, and a channel decoder.

The DE-MUX 1204 splits the packets output from the physical layer decoder 1202 by the preset rule.

The packet extractor 1206 detects errors in the data packets output from the DE-MUX 1204, and outputs the payload by removing the headers. More particularly, according to an exemplary embodiment of the present invention, the packet extractor 1206 detects the FID and the EH by decoding the MAC header. When the detected FID matches the multicast FID and the detected EH indicates the presence of the extended header, the packet extractor 1206 detects the Type and the MFID by decoding the extended header. When the detected Type is the MFEH, the packet extractor 1206 obtains the E-MBS service flow information using the detected MFID and decodes the payload using the obtained E-MBS service flow information. According to another exemplary embodiment, the packet extractor 1206 detects the MFID by decoding the MAC header, acquires the E-MBS service flow information using the detected MFID, and decodes the payload using the acquired E-MBS service flow information.

The A-MAP analyzer 1208 and the E-MBS MAP analyzer 1210 each acquire the resource allocation information of the UL/DL packets by analyzing the packets output from the DE-MUX 1204, and provide the acquired information to the packet extractor 1206. According to yet another exemplary embodiment, the A-MAP analyzer 1208 acquires the burst allocation information for the unicast packet by decoding the A-MAP IE, and provides the acquired information to the packet extractor 1206. In so doing, the E-MBS MAP analyzer 1210 acquires the MFID including the E-MBS service flow information and the burst allocation information for the multicast packet by decoding the E-MBS_Data IE. When the acquired MFID corresponds to the intended multicast service flow of the MS, the E-MBS MAP analyzer 1210 provides the packet extractor 1206 with the E-MBS service flow information and the burst allocation information for the multicast packet. According to still another exemplary embodiment, the A-MAP analyzer 1208 acquires the number of the A-MAP IEs of the multicast group and the number of the A-MAP IEs of the unicast group by decoding the non-user specific region. Next, the A-MAP analyzer 1208 acquires the burst allocation information for the unicast packet by decoding the corresponding A-MAP IEs as many as the A-MAP IEs of the unicast group, and provides the acquired information to the packet extractor 1206. The A-MAP analyzer 1208 acquires the MFID including the E-MBS service flow information and the burst allocation information for the multicast packet by decoding the corresponding A-MAP IEs as many as the A-MAP IEs of the multicast group. When the acquired MFID corresponds to the intended multicast service flow of the MS, the A-MAP analyzer 1208 provides the E-MBS service flow information and the burst allocation information for the multicast packet to the packet extractor 1206.

In accordance with an exemplary embodiment of the present invention, the MS can further include a message transmitter and receiver. The message transmitter and receiver receives and processes the AAI-REG_REQ message from the BS for the E-MBS capability exchange between the MS and the BS, and generates and sends the AAI-REG_RSP message to the BS. Next, the message transmitter and receiver receives and processes the AAI-E-MBS_CFG message from the BS. Herein, the AAI-E-MBS_CFG message includes the information of the E-MBS zone of the MS, the location of the E-MBS MAP, and the resource information allocated to the E-MBS in the entire frame. Next, when the AAI-E-MBS_CFG message contains the location information of the E-MBS MAP, the message transmitter and the receiver receives and processes the AAI_DSA-REQ message from the BS for the E-MBS service flow establishment between the MS and the BS, and generates and sends the AAI_DSA-RSP message to the BS.

As set forth above, since the MS transmits the MFID using the separate MAP in the broadband wireless access system, the MS can acquire the multicast burst in advance using the information contained in the MAP region, without having to determine whether each burst is the multicast burst based on the header.

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Mobile Station (MS) for supporting multicast communication in a wireless access system, the method comprising:
   acquiring decoding parameters by receiving an Advanced Air Interface-Enhanced-Multicast and Broadcast Service configuration (AAI-E-MBS_CFG) message from a Base Station (BS);
   establishing an E-MBS service flow by sending and receiving AAI_Dynamic Service Addition-request/response (AAI_DSA-REQ/RSP) messages to and from the BS; and
   decoding E-MBS MAP received from the BS through the established E-MBS service flow using the acquired decoding parameters,
   wherein the E-MBS MAP comprises information for decoding multicast bursts.

2. The method of claim 1, wherein the AAI-E-MBS_CFG message comprises at least one of E-MBS zone identifier information of the MS, location information of the E-MBS MAP, information relating to a resource allocated to the E-MBS in a frame, and LIFE TIME information.

3. The method of claim 1, further comprising:
   determining whether a pre-received super-frame comprises E-MBS MAP to decode, based on the acquired decoding parameters,
   wherein the E-MBS service flow is established when the pre-received super-frame comprises the E-MBS MAP to decode according to the acquired decoding parameters.

4. The method of claim 1, further comprising, before the acquiring of the decoding parameters:
   exchanging E-MBS capabilities by sending and receiving AAI registration request/response (AAI-REG_REQ/RSP) messages to and from the BS.

5. The method of claim 1, further comprising:
   detecting E-MBS service flow information and multicast burst information by decoding an E-MBS_Data IE in the decoded E-MBS MAP; and
   when the detected E-MBS service flow information corresponds to the established E-MBS service flow, decoding multicast bursts received from the BS using the detected multicast burst information.

6. The method of claim 5, wherein the multicast burst information comprises at least one of allocation information of the multicast bursts, a location of a frame carrying the multicast bursts, a Modulation and Coding Scheme (MCS) level of the multicast bursts, and a period of a next E-MBS frame.

7. The method of claim 1, wherein the acquiring of the decoding parameters comprises:
  receiving the AAI-E-MBS_CFG message from the BS;
  determining whether a LIFE TIME indicated by a LIFE-TIME counter managed by the MS is zero; and
  when the LIFE TIME is zero, acquiring the decoding parameters by decoding the AAI-E-MBS_CFG message.

8. The method of claim 7, further comprising:
  acquiring a valid MBS Scheduling Interval (MSI) of other information in the acquired decoding parameters from the LIFE TIME information of the decoding parameters; and
  after the acquiring of the valid MSI, initializing the LIFE TIME indicated by the LIFETIME counter.

9. The method of claim 8, further comprising:
  when the LIFE TIME is not zero, decreasing the LIFE TIME indicated by the LIFE TIME counter by one after the acquiring of the valid MSI, without decoding the AAI-E-MBS_CFG message.

10. The method of claim 1, wherein the AAI_DSA-REQ/RSP messages comprise at least one of information relating to whether an E-MBS service is requested or provided, information of an E-MBS zone of valid connection associated with the service flow, mapping information of an E-MBS ID and an Flow Identifier (FID), and information of a target carrier switched by the MS or a target carrier redirected by the BS,
  wherein the E-MBS ID is a Station Identifier (STID) for multicast service, the FID is a flow identifier indicating a type of the multicast service, a number of STIDs among all the STIDs are allocated for the multicast service, and the other STIDs are allocated for a unicast service.

11. An apparatus of a Mobile Station (MS) for supporting multicast communication in a wireless access system, the apparatus comprising:
  a message transmitter and receiver for acquiring decoding parameters by receiving an Advanced Air Interface-Enhanced-Multicast and Broadcast Service configuration (AAI-E-MBS_CFG) message from a Base Station (BS), and establishing an E-MBS service flow by sending and receiving AAI Dynamic Service Addition-request/response (AAI_DSA-REQ/RSP) messages to and from the BS; and
  an E-MBS MAP analyzer for decoding E-MBS MAP received from the BS through the established E-MBS service flow using the acquired decoding parameters,
  wherein the E-MBS MAP comprises information for decoding multicast bursts.

12. The apparatus of claim 11, wherein the AAI-E-MBS_CFG message comprises at least one of E-MBS zone identifier information of the MS, location information of the E-MBS MAP, information relating to a resource allocated to the E-MBS in a frame, and LIFE TIME information.

13. The apparatus of claim 11, wherein the message transmitter and receiver determines whether a pre-received superframe comprises E-MBS MAP to decode, based on the acquired decoding parameters, and establishes the E-MBS service flow when determining that the pre-received superframe comprises the E-MBS MAP to decode according to the acquired decoding parameters.

14. The apparatus of claim 11, wherein, before the acquiring of the decoding parameters, the message transmitter and receiver exchanges E-MBS capabilities by sending and receiving AAI registration request/response (AAI-REG_REQ/RSP) messages to and from the BS.

15. The apparatus of claim 11, wherein the E-MBS MAP analyzer detects E-MBS service flow information and multicast burst information by decoding an E-MBS_Data IE in the decoded E-MBS MAP.

16. The apparatus of claim 15, further comprising:
  a packet extractor for, when the detected E-MBS service flow information corresponds to the established E-MBS service flow, decoding multicast bursts received from the BS using the detected multicast burst information,
  wherein the multicast burst information comprises at least one of allocation information of the multicast bursts, a location of a frame carrying the multicast bursts, a Modulation and Coding Scheme (MCS) level of the multicast bursts, and a period of a next E-MBS frame.

17. The apparatus of claim 11, wherein the message transmitter and receiver receives the AAI-E-MBS_CFG message from the BS, determines whether a LIFE TIME indicated by a LIFETIME counter managed by the MS is zero, and, when determining that the LIFE TIME is zero, acquires the decoding parameters by decoding the AAI-E-MBS_CFG message.

18. The apparatus of claim 17, wherein the message transmitter and receiver acquires a valid MBS Scheduling Interval (MSI) of other information in the acquired decoding parameters, from the LIFE TIME information of the decoding parameters, and after the acquiring of the valid MSI, initializes the LIFE TIME indicated by the LIFETIME counter.

19. The apparatus of claim 18, wherein, when determining that the LIFE TIME is not zero, the message transmitter and receiver decreases the LIFE TIME indicated by the LIFE TIME counter by one after the acquiring of the valid MSI, without decoding the AAI-E-MBS_CFG message.

20. The apparatus of claim 11, wherein the AAI_DSA-REQ/RSP messages comprise at least one of information relating to whether an E-MBS service is requested or provided, information of an E-MBS zone of valid connection associated with the service flow, mapping information of an E-MBS ID and an FID, and information of a target carrier switched by the MS or a target carrier redirected by the BS,
  wherein the E-MBS ID is a Station Identifier (STID) for multicast service, the FID is a flow identifier indicating a type of the multicast service, a number of STIDs among all the STIDs are allocated for the multicast service, and the other STIDs are allocated for a unicast service.

21. A method of a Base Station (BS) for supporting multicast communication in a wireless access system, the method comprising:
  sending an Advanced Air Interface-Enhanced-Multicast and Broadcast Service configuration (AAI-E-MBS_CFG) message comprising decoding parameters, to a Mobile Station (MS);
  establishing an E-MBS service flow by sending and receiving AAI Dynamic Service Addition-request/response (AAI_DSA-REQ/RSP) messages to and from the MS; and
  transmitting E-MBS MAP to the MS through the established E-MBS service flow,
  wherein the E-MBS MAP comprises information for decoding multicast bursts.

22. The method of claim 21, wherein the AAI-E-MBS_CFG message comprises at least one of E-MBS zone identifier information of the MS, location information of the E-MBS MAP, information relating to a resource allocated to the E-MBS in a frame, and LIFE TIME information.

23. The method of claim 21, further comprising, before the sending of the AAI-E-MBS_CFG message:

exchanging E-MBS capabilities by sending and receiving AAI registration request/response (AAI-REG_REQ/RSP) messages to and from the MS.

24. The method of claim 21, wherein the information for decoding the multicast bursts comprises at least one of E-MBS service flow information, allocation information of the multicast bursts, a location of a frame carrying the multicast bursts, a Modulation and Coding Scheme (MCS) level of the multicast bursts, and a period of a next E-MBS frame.

25. The method of claim 21, wherein the AAI_DSA-REQ/RSP messages comprise at least one of information relating to whether an E-MBS service is requested or provided, information of an E-MBS zone of valid connection associated with the service flow, mapping information of an E-MBS ID and an FID, and information of a target carrier switched by the MS or a target carrier redirected by the BS,
wherein the E-MBS ID is a Station Identifier (STID) for multicast service, the FID is a flow identifier indicating a type of the multicast service, a number of STIDs among all the STIDs are allocated for the multicast service, and the other STIDs are allocated for a unicast service.

26. An apparatus of a Base Station (BS) for supporting multicast communication in a wireless access system, the apparatus comprising:
a message transmitter and receiver for sending an Advanced Air Interface Enhanced-Multicast and Broadcast Service configuration (AAI-E-MBS_CFG) message comprising decoding parameters, to a Mobile Station (MS), establishing E-MBS service flow by sending and receiving AAI Dynamic Service Addition-request/response (AAI_DSA-REQ/RSP) messages to and from the MS, and transmitting E-MBS MAP to the MS through the established E-MBS service flow; and an E-MBS MAP generator for generating the E-MBS MAP which comprises information for decoding multicast bursts.

27. The apparatus of claim 26, wherein the AAI-E-MBS_CFG message comprises at least one of E-MBS zone identifier information of the MS, location information of the E-MBS MAP, information relating to a resource allocated to the E-MBS in a frame, and LIFE TIME information.

28. The apparatus of claim 26, wherein the message transmitter and receiver, before sending the AAI-E-MBS_CFG message, exchanges E-MBS capabilities by sending and receiving registration request/response (AAI-REG_REQ/RSP) messages to and from the MS.

29. The apparatus of claim 26, wherein the information for decoding the multicast bursts comprises at least one of E-MBS service flow information, allocation information of the multicast bursts, a location of a frame carrying the multicast bursts, a Modulation and Coding Scheme (MCS) level of the multicast bursts, and a period of a next E-MBS frame.

30. The apparatus of claim 26, wherein the AAI_DSA-REQ/RSP messages comprise at least one of information relating to whether an E-MBS service is requested or provided, information of an E-MBS zone of valid connection associated with the service flow, mapping information of an E-MBS ID and an FID, and information of a target carrier switched by the MS or a target carrier redirected by the BS,
wherein the E-MBS ID is a Station Identifier (STID) for multicast service, the FID is a flow identifier indicating a type of the multicast service, a number of STIDs among all the STIDs are allocated for the multicast service, and the other STIDs are allocated for a unicast service.

* * * * *